United States Patent
Kajita et al.

(10) Patent No.: US 10,447,125 B2
(45) Date of Patent: Oct. 15, 2019

(54) TOOL FOR HOLDLING COIL FOR ELECTROMECHANICAL DEVICE FOR CONVERTING ELECTRICAL ENERGY AND MECHANICAL ENERGY

(71) Applicant: HAYASHI INDUSTRY CO., LTD., Gifu (JP)

(72) Inventors: Ko Kajita, Gifu (JP); Takahiko Hobo, Gifu (JP)

(73) Assignee: Hayashi Industry Co., LTD., Nakatsugawa (JP)

( * ) Notice: Subject to any disclaimer, the term of this patent is extended or adjusted under 35 U.S.C. 154(b) by 0 days.

(21) Appl. No.: 15/577,638

(22) PCT Filed: Mar. 8, 2016

(86) PCT No.: PCT/JP2016/057066
§ 371 (c)(1),
(2) Date: Nov. 28, 2017

(87) PCT Pub. No.: WO2016/203794
PCT Pub. Date: Dec. 22, 2016

(65) Prior Publication Data
US 2018/0166957 A1   Jun. 14, 2018

(30) Foreign Application Priority Data
Jun. 18, 2015   (WO) .................. PCT/JP2015/067548

(51) Int. Cl.
*H02K 15/04*   (2006.01)
*H02K 15/06*   (2006.01)
(Continued)

(52) U.S. Cl.
CPC ......... *H02K 15/0464* (2013.01); *H01F 41/07* (2016.01); *H01F 41/071* (2016.01);
(Continued)

(58) Field of Classification Search
CPC ............. H02K 15/0464; H02K 15/065; H02K 15/066; H02K 3/14; H02K 3/28;
(Continued)

(56) References Cited

U.S. PATENT DOCUMENTS

| 5,926,940 A | 7/1999 | Toh et al. |
| 2005/0218746 A1* | 10/2005 | Fukasaku ............... H02K 15/06 310/208 |

FOREIGN PATENT DOCUMENTS

| JP | H08182235 | 7/1996 |
| JP | H08182238 | 7/1996 |

(Continued)

OTHER PUBLICATIONS

Machine translation of JP 2013233026 A (Nov. 2013).*
(Continued)

*Primary Examiner* — Michael Andrews
(74) *Attorney, Agent, or Firm* — Trego, Hines & Ladenheim, PLLC

(57) ABSTRACT

The present invention was contrived through attention being focused on the following in a prior-art distributed-winding coil: a "solenoid" configuration in which winding wires are to be wound is preserved when initially formed, but this configuration tends to be loosened during subsequent steps, and the initial winding sequence of the winding wires, or the position of the winding wires relative to each other, tends to be disrupted, and accordingly must be prevented, when a certain force is applied and the necessary bending or deformation is induced in coils with distributed winding in which the solenoid configuration is preserved, or when the coils are ultimately inserted into slots. Therefore, as a solution, the present invention provides a holding tool 30 provided with: at least two substrates 32 linked at one end so as to be able to open and close; an outlet 31 formed at the other end of the substrates 32; and a holding space 32a capable of opening on (Continued)

the outlet 31 side, and holding the first accommodation portion 11a or the second accommodation portion 11b of a coil 10 while maintaining the alignment state of the winding wires 10A that constitute part of the first accommodation portion 11a and the second accommodation portion 11b when the substrates 32 are closed; the holding tool 30 being capable of forming a twist portion at a first coil end and a second coil end and reducing the size of the coil ends of the coils while maintaining the alignability of the winding wires that constitute part of the first and second accommodation portions of the coil 10.

3 Claims, 25 Drawing Sheets

(51) Int. Cl.
*H01F 41/07* (2016.01)
*H01F 41/071* (2016.01)
*H02K 3/14* (2006.01)
*H02K 3/28* (2006.01)
*H02K 3/48* (2006.01)
*H02K 3/12* (2006.01)
*H02K 1/16* (2006.01)
*H02K 1/26* (2006.01)

(52) U.S. Cl.
CPC .................. *H02K 3/14* (2013.01); *H02K 3/28* (2013.01); *H02K 3/48* (2013.01); *H02K 15/065* (2013.01); *H02K 15/066* (2013.01); *H02K 1/16* (2013.01); *H02K 1/26* (2013.01); *H02K 3/12* (2013.01)

(58) Field of Classification Search
CPC .. H02K 3/48; H02K 3/12; H02K 1/16; H02K 1/26; H01F 41/07; H01F 41/071
USPC .......................................................... 310/208
See application file for complete search history.

(56) References Cited

FOREIGN PATENT DOCUMENTS

| | | | | |
|---|---|---|---|---|
| JP | H09271157 | | 10/1997 | |
| JP | H1066314 | | 3/1998 | |
| JP | H10174329 | | 6/1998 | |
| JP | 2003204659 | | 7/2003 | |
| JP | 2005295689 | | 10/2005 | |
| JP | 2008109829 | | 5/2008 | |
| JP | 2008148375 | | 6/2008 | |
| JP | 2009195005 | | 8/2009 | |
| JP | 2010158096 | | 7/2010 | |
| JP | 2011072052 | | 4/2011 | |
| JP | 2013233026 | | 11/2013 | |
| JP | 2013233026 A | * | 11/2013 | ............. H02K 15/04 |
| JP | 2013233026 A | * | 11/2013 | |
| JP | 2014180129 | | 9/2014 | |

OTHER PUBLICATIONS

Machine translation of JP 2013233026 A (Nov. 2013). (Year: 2013).*
International Search Report for PCT/JP2016/056359, dated Jun. 21, 2016, Japan Patent Office, Tokyo, Japan.
International Search Report for PCT/JP2016/057066, dated Jun. 7, 2016, Japan Patent Office, Tokyo, Japan.

* cited by examiner

Fig.1
(a)
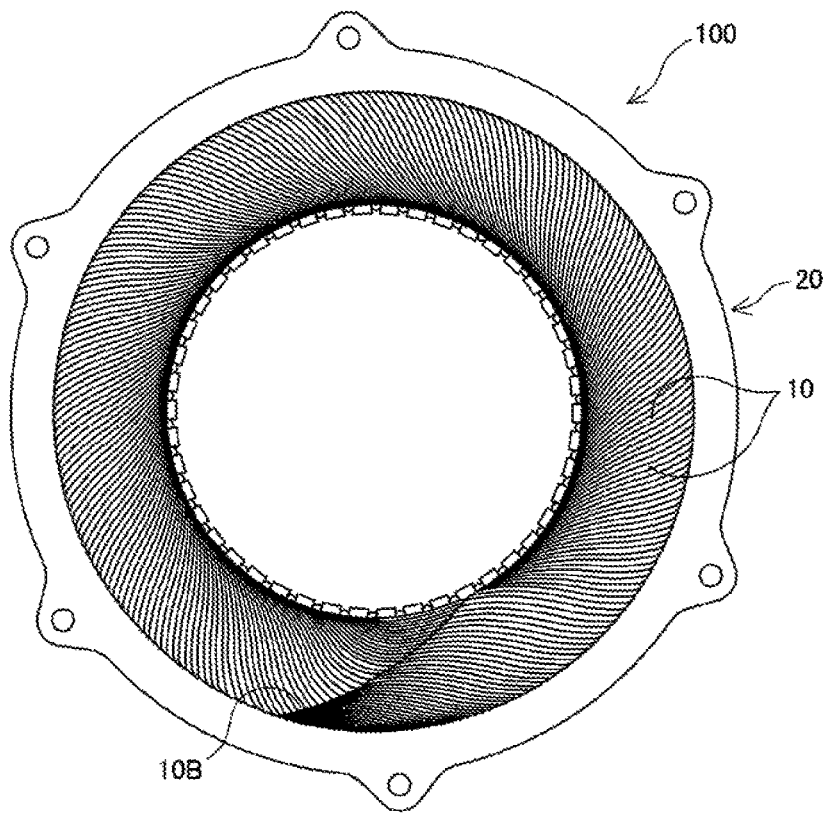
(b)
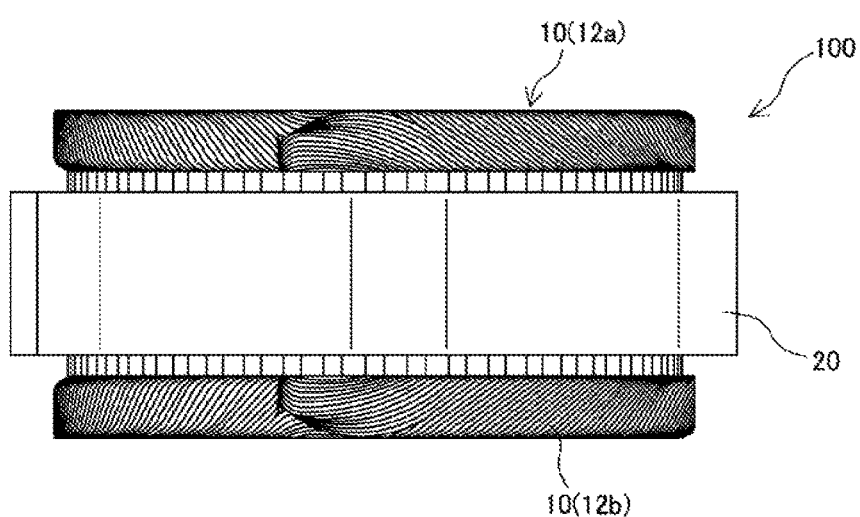

Fig.3
(a)
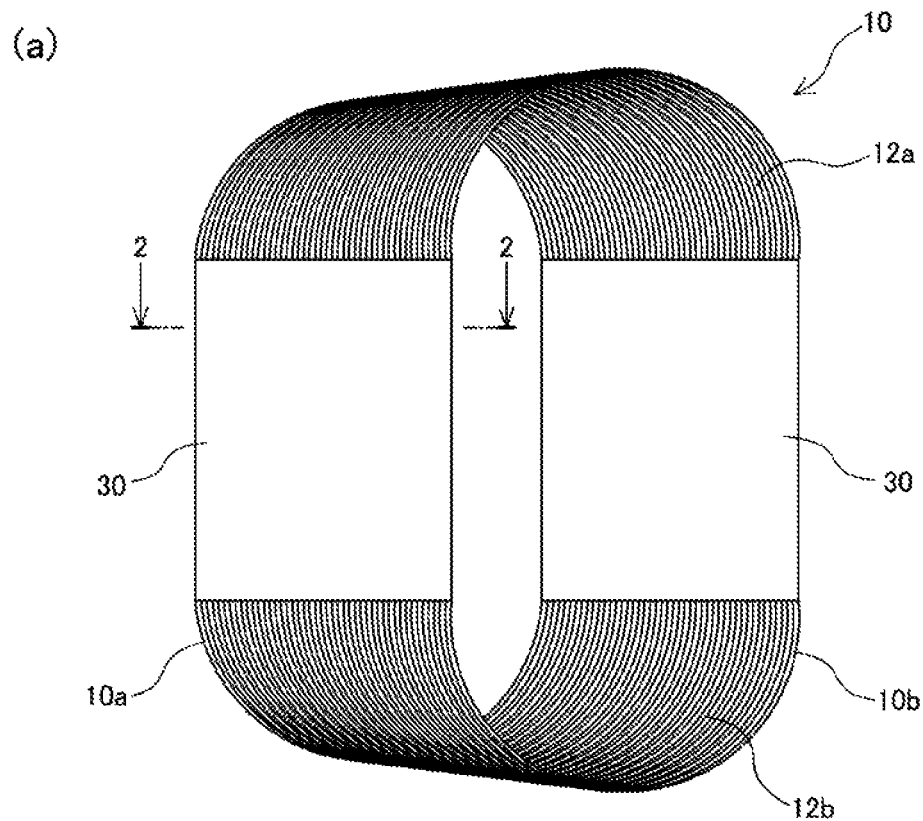
(b)
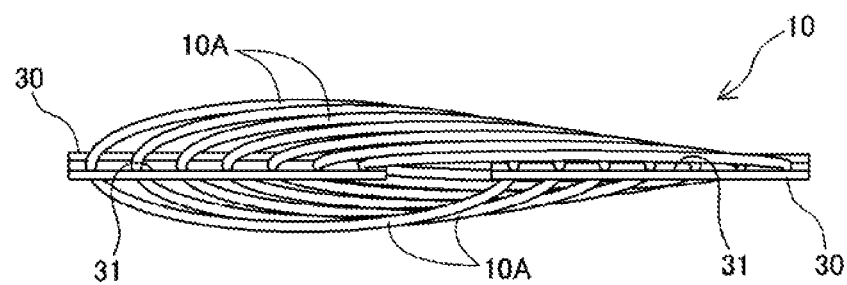

Fig.7
(a)
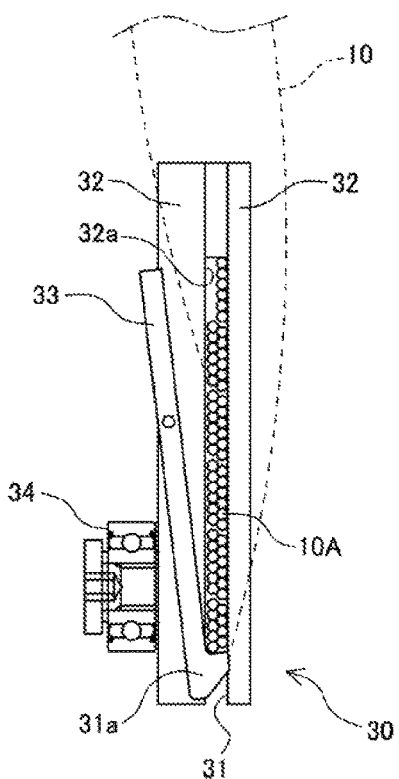
(b)
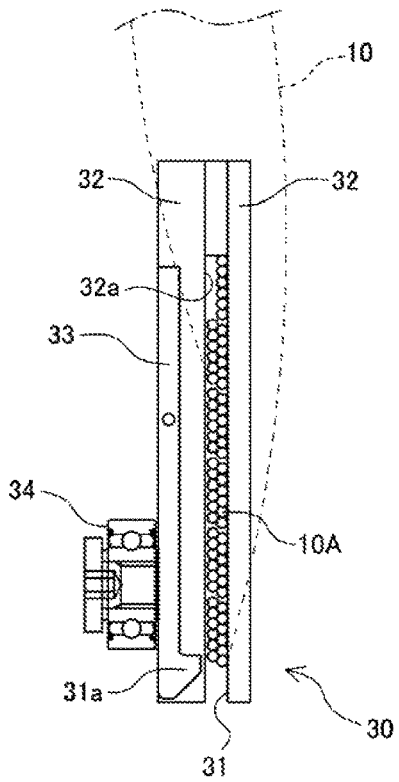

Fig.9
(a)
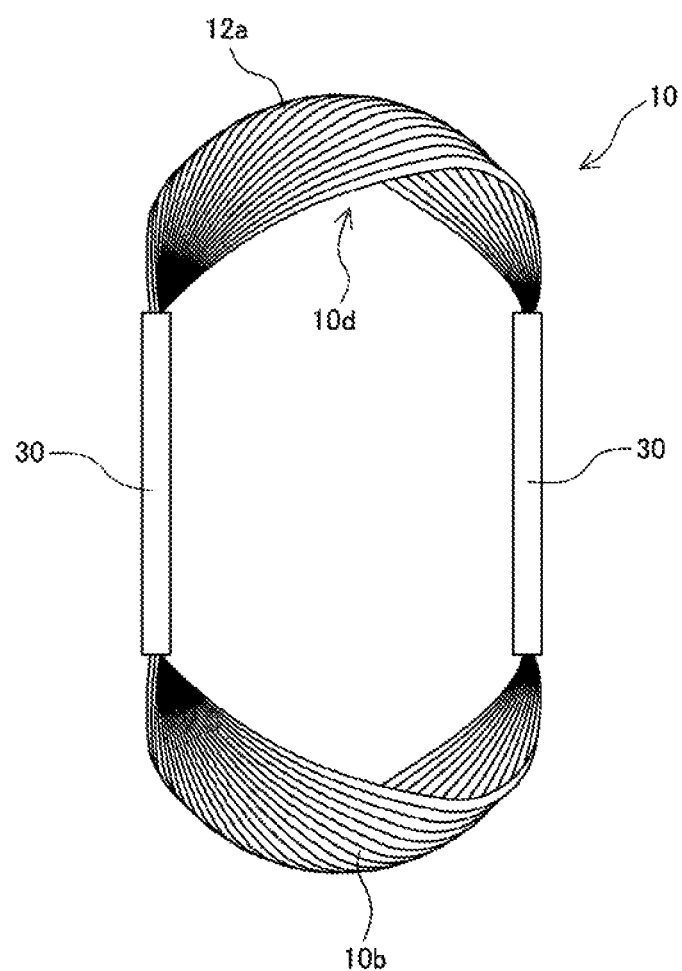
(b)
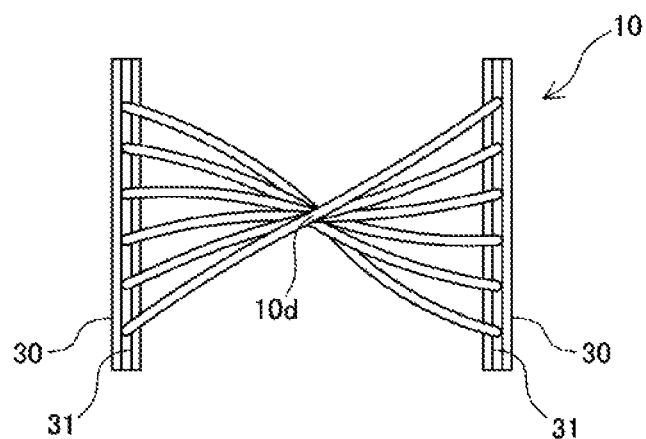

Fig.20
(a)
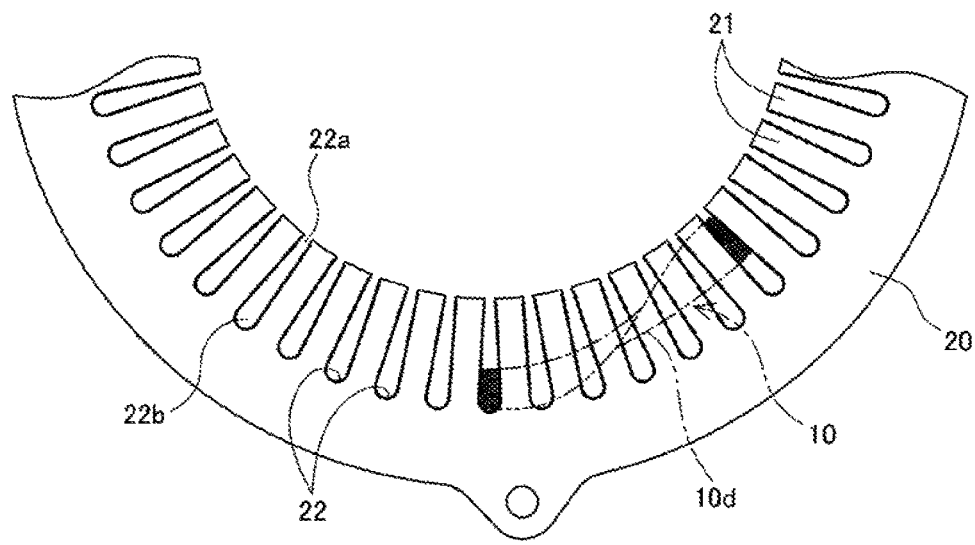
(b)
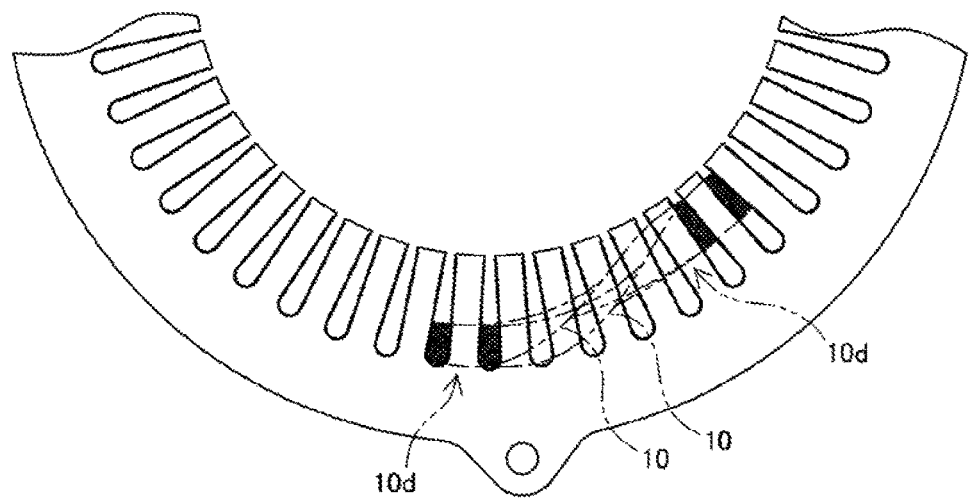

Fig.22
(a)
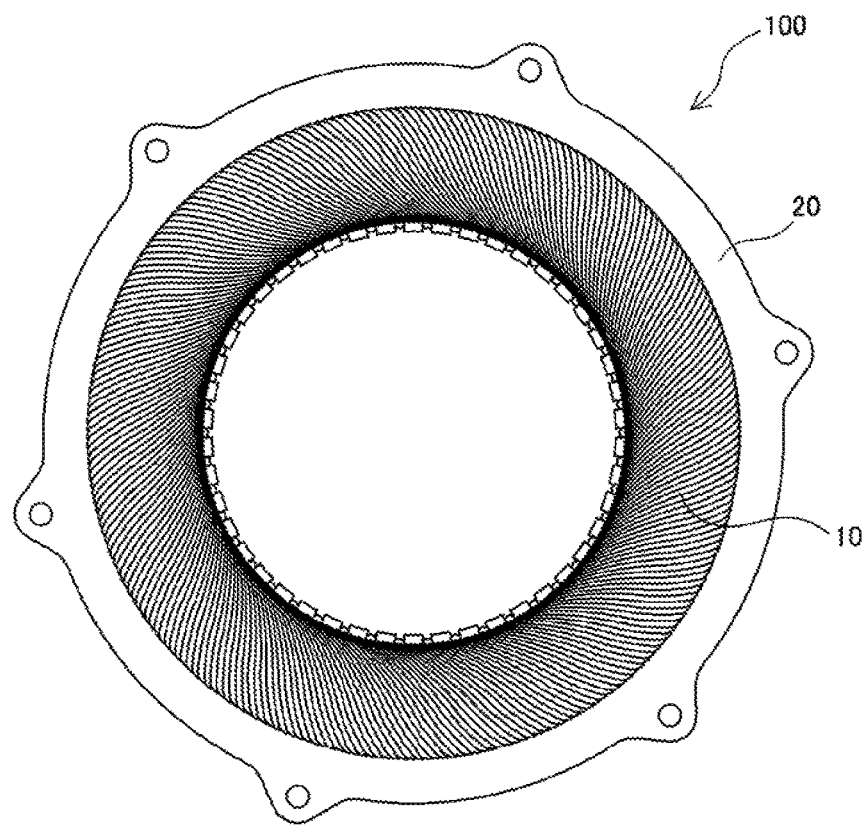
(b)
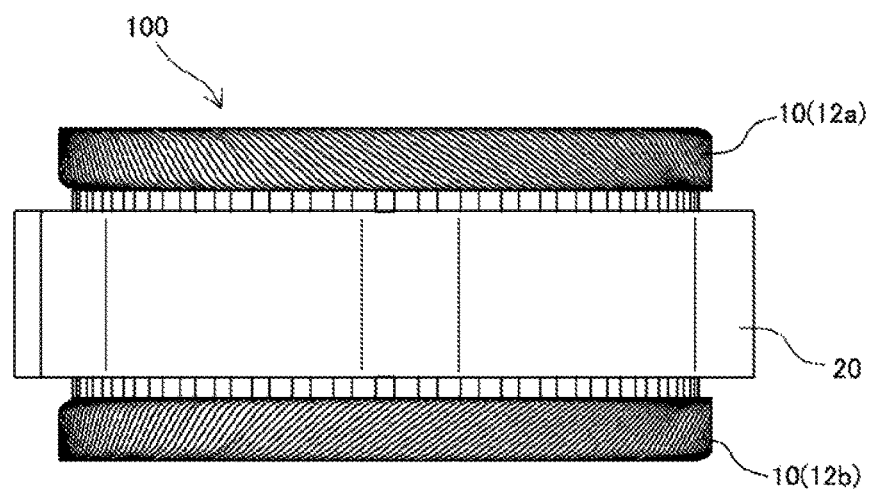

Fig.26
(a)
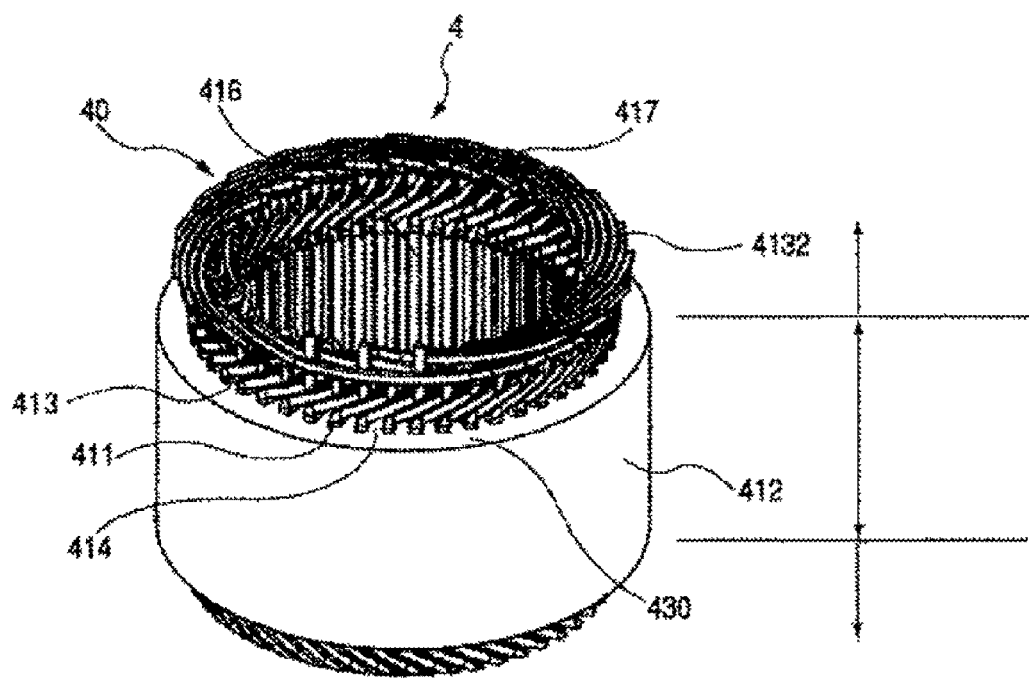
(b)
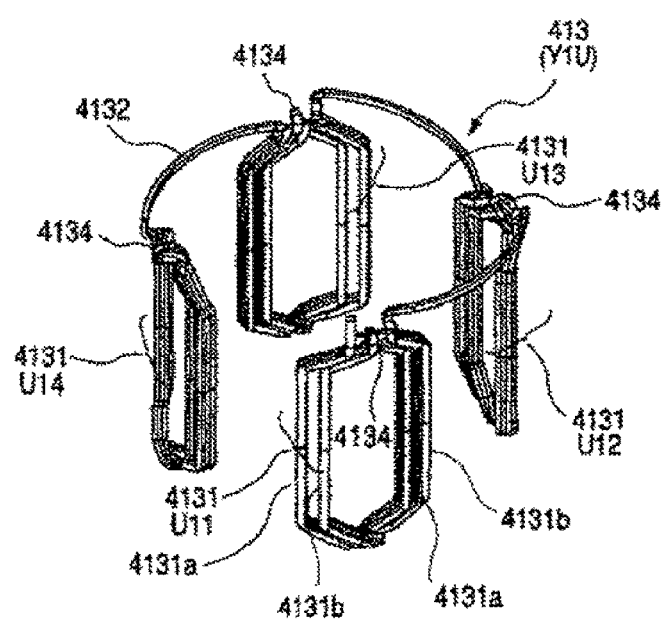

TOOL FOR HOLDLING COIL FOR ELECTROMECHANICAL DEVICE FOR CONVERTING ELECTRICAL ENERGY AND MECHANICAL ENERGY

BACKGROUND OF THE INVENTION

Field of the Invention

The present invention relates to a tool for holding a coil for electromechanical devices such as motors and generators which convert electrical energy and mechanical energy.

Description of the Related Art

The process of manufacturing coils for electromechanical devices which convert electrical energy and mechanical energy, wherein a coil is wound around a plurality of teeth of a core enclosing a rotor, is very difficult. This is because the space (slot) between each of the teeth is very narrow and deep. Great skill is therefore required to wind an amount of coils needed to obtain a sufficient magnetic flux density.

Typical automatable methods that are capable of winding coils at a high density around a core of an electromechanical device are known. For example, Japanese Unexamined Patent Application Publication No. 1999-312621 proposes a method of "concentrated winding", in which coils are wound concentrated around each tooth, and Japanese Unexamined Patent Application Publication No. 2009-195005 proposes a method of "distributed winding", in which coils are wound across a plurality of slots and coils which are in phase or out of phase with each other are overlapped at the coil ends.

As shown in FIG. 25 (a), the coils disclosed in Japanese Unexamined Patent Application Publication No. 1999-312621 are individually wound around each one of a plurality of cores 72 which are separated into multiple sections, such that one coil is wound around one tooth 104 of each core 72. FIG. 25 (b) shows one such coil on its own, in which a rectangular wire is wound in three layers. The cores 72 around which the coils are wound are arranged in a circular shape and integrated to form a stator as shown in FIG. 25 (a).

The coil winding device proposed in Japanese Unexamined Patent Application Publication No. 1999-312621 employs concentrated winding, enabling the coil ends to be smaller compared to in distributed winding as described below, which is useful in making the electromechanical device compact and improving its efficiency. On the other hand, as shown in FIG. 25 (a), there will always be a portion of each slot where no coil is present, because the T-shaped cores 72 must be formed in one piece with each other. Also, when the rectangular wire windings are wound into the state shown in FIG. 25 (b), the rectangular wire needs to be bent at right angles at the corners of the coil, which causes strain on the bent portions of the rectangular wire. Further, the winding device proposed in Japanese Unexamined Patent Application Publication No. 1999-312621 is of a configuration in which rollers are in contact with the rectangular wires as they move back and forth relative to a rotating bobbin, meaning that the device is limited to rectangular wires, and cannot be applied to round wires that have a circular cross-section.

The coils disclosed in Japanese Unexamined Patent Application Publication No. 2009-195005, which employs distributed winding, are stored in the slots of the core, as shown in FIG. 26 (a). This core consists of, for example, 48 slots 411 provided with teeth 414 therebetween, the teeth 414 being integrated with a cylindrical core back 430, in which the coils are stored between the teeth 414 (in the slots), each coil wound around and across a plurality of teeth 414.

One such coil is shown on its own in FIG. 26 (b), and consists of a rectangular wire that is wound in a plurality of layers. As shown in FIG. 20: "The two coils formed by α-winding a conductor strand whose cross section is rectangular are continuously prepared. The two-continuous lap-wound coil is formed by molding the two-continuous α-wound coil into an oval coin shape, and the coil is formed by being inserted into a slot of the stator. The two-continuous α-wound coil is formed so that the center of a corner wire is pressed against a winding frame, and two rollers are abutted on the corner wire attached to the winding frame so as to be mutually reversely rotated". (From the Abstract of Japanese Unexamined Patent Application Publication No. 2009-195005.)

In Japanese Unexamined Patent Application Publication No. 2009-195005, coils formed as shown in FIG. 26 (b) are stored in a plurality of grooves of an inner jig 36 as shown in FIG. 27, which is inserted into the core after which the coils are pushed into corresponding slots. The jig 36 is removed from the core after the coils have been stored, resulting in a coil-equipped core as shown in FIG. 26 (a).

In the coil-equipped core proposed in Japanese Unexamined Patent Application Publication No. 2009-195005, as shown in FIG. 26 (a), the "coil end portions" protrude substantially upward and downward from the "slot portion (core portion)". Judging by this appearance, it is likely that significant copper loss will occur at the coil end portions. The substantial protrusion of the coil end portions from the slot (core) portion means not only that copper loss, i.e. loss of energy, is great, but also that a large space is required to store this kind of core.

Incidentally, when it comes to coils for electromechanical devices, the coils themselves, the teeth around which the coils are to be wound, and the slots in which the coils are to be stored must generally be formed uniformly and at equal distances from each other. This is because there is a need to make the rotation of the electrical motor smooth so as to achieve stable functionality, by making each coil generate or cut a constant magnetic flux density per unit time.

While the best way to increase energy density is to fill each slot with as many conducting wires as possible, winding conducting wires (coils) without gaps in the narrow, deep slots is not that simple, as is apparent from FIG. 25 (a).

Further, in order to mass-produce this kind of coil, cores in which the coils are mounted, and electromechanical devices including these components in an automated manner, the following problems must be solved simultaneously and comprehensively.

It is a fact regarding coils in general, that in a case where one conventional coil is stored across two slots, the windings in the same position of the coil will be located in the same position of both slots. Since the slots, both on the rotor side and on the core side, are formed radially relative to the center of the armature, the measurements of their inner sides and the measurements of their outer sides are different. Thus, when an ordinary coil is stored within two slots, the windings will be stored in the same position, which causes inductance non-uniformity in the inner and outer windings (wires) relative to a magnet provided outside the armature, leading to an overall drop in efficiency of the coil. The reason for this is that when an identical voltage is applied to the wires simultaneously, a greater current will flow in the wires with lower inductance, and this inductance non-uniformity will work toward reducing overall efficiency of the coil. There is thus a demand for a coil configured to enable equalization of the inductance non-uniformity in the windings to allow for improvement of the efficiency coil.

To that end, an armature proposed in Japanese Patent No. 5394058 has the following configuration, as described in claim 1 thereof:

"An armature of an electric motor comprising:
a core including a plurality of slots and a plurality of teeth formed between the slots; and
a winding made of a bundled plurality of wires, the winding including a plurality of coil parts and a plurality of connecting portions, the coil parts inserted into the slots and wound around and across the plurality of teeth by distributed winding, the connecting portions connecting the coil parts together, the winding having a twisted shape in the connecting portions".

This configuration was made in view of the problem of conventional armatures that inductance non-uniformity in each wire is the cause of lower coil efficiency and reduced motor efficiency, and made improvements for the purpose of providing an armature and electric motor that can improve motor efficiency.

Meanwhile, paragraph [0013] of Japanese Patent No. 5394058 discloses the following: "The winding includes coil parts and connecting portions. The coil parts are inserted into the slots and wound around and across the plurality of teeth by distributed winding. The connecting portions connect the coil parts together. The winding has a twisted shape in the connecting portion".

Thus, it is found based on claim 1 of Japanese Patent No. 5394058 that the armature proposed therein is characterized in that:
- the coils are wound around and across the plurality of teeth several times by distributed winding
- the coils are connected together by the connecting portions
- the windings have a twisted shape in the connecting portions.

As mentioned above, these "connecting portions" disclosed in Japanese Patent No. 5394058 serve to "connect the coil parts together", and thus correspond to the "connecting lines electrically connecting the coils to each other" of the invention described below, and not the "coil ends" (the sections that electrically connect the sections of the distributedly wound windings inserted into the slots on both sides of the core) that constitute the coils themselves. In other words, merely twisting these "connecting portions" disclosed in Japanese Patent No. 5394058 does not make it possible to increase the density of windings at the coil ends to suppress the occurrence of copper loss, and thus cannot improve efficiency of the electromechanical device at the coil ends.

Thus, in this kind of coil, typical problems that must be solved in a comprehensive and simultaneous manner are as follows:
(A) It should be possible to use both round wires and rectangular wires as the conducting wires that constitute the coils, with no limitations on the shape of the cross-section of the wires.
(B) Manufacturing and handling of the coils themselves should be easy.
(C) Insertion of coils into the slots should be made easier.
(D) Space factor of coils in the slots should be increased.
(E) The coil ends should be made smaller when used in an electromechanical device.
(F) It should be possible to equalize the inductance non-uniformity in each winding to increase efficiency when used in an electromechanical device.
(G) As a result, it should be possible to make the electromechanical device compact and efficient, and also to facilitate manufacturing of the electromechanical device itself.
As proposed in the patent literature cited above, these problems are gradually being addressed.

The contents of Japanese Unexamined Patent Application Publication No. 1999-312621, Japanese Unexamined Patent Application Publication No. 2009-195005, and Japanese Patent No. 5394058 are incorporated herein by reference in their entirety.

SUMMARY OF THE INVENTION

Problems to be Solved by the Invention

In view of the above, the inventors have considered how to obtain a coil that achieves the aforementioned objects (A) to (G) in a comprehensive and simultaneous manner, and conceived of the following invention:

"A coil 10 to be installed in a slot 22 between teeth 21 of a stator core or rotor 20 for an electromechanical device that converts electrical energy and mechanical energy, the coil 10 comprising:
a first storage section 11a and a second storage section 11b that are to be stored in the slots 22, and a first coil end 12a and a second coil end 12b that are continuous between the first and second storage sections 11a and 11b, formed by winding one or more windings 10A; and two holding tools 30 that hold the windings 10A constituting the first storage section 11a and the second storage section 11b while maintaining the alignment of the windings 10A with each other; wherein when the two holding tools 30 are rotated relative to each other, a twisted section 10d can be formed in the first coil end 12a and the second coil end 12b while maintaining the alignment of the first storage section 11a and the second storage section 11b with each other, and the coil 10 can be mounted in the slot 22 between the teeth 21".

However, the inventors then became acutely aware of the need to clarify the holding tools 30 that are a prerequisite for the aforementioned invention.

This is because, in a conventional distributedly wound coil, the first shape the coil takes, as shown in FIG. 25 (b), is that of the bobbin around which the coil was wound, a shape which easily becomes unraveled in subsequent steps in the process. In addition, when any kind of force is applied to the distributedly wound coil still in the shape of the bobbin, such as making a necessary bend or deformation, and when finally inserting the coil into the slot, the initial winding order or relative positions of the windings is easily ruined, which needs to be prevented. The aforementioned holding tools 30 fulfill this requirement.

In other words, it is an object of the present invention to provide a holding tool for coils that is capable of enabling formation of a twisted section 10d in the first and second coil ends while maintaining the alignment of the first and second storage sections of the coil 10 with each other, facilitating manufacturing of coils, allowing for easy insertion of coils into the slots with a high space factor of windings in the slots, consequently enabling the coil ends of the coil to be made smaller when used in an electromechanical device.

Means of Solving the Problems

In order to solve the aforementioned problems, the invention according to claim 1 employs the following means, described here using reference numerals that are used in the below description of an embodiment of the present invention:

"A pair of holding tools 30 configured to hold a coil 10 to be mounted in slots 22 between a plurality of teeth 21 of a core 20 for an electromechanical device that converts electrical and mechanical energy, each holding tool 30 comprising:

at least two base plates 32 openably coupled at one end;
an exit 31 formed between the other ends of the base plates 32, the exit 31 capable of being aligned with an axial opening 23 of one slot 22; and
a holding space 32a that is openable at the exit 31 and that, when the base plates 32 close, holds windings 10A constituting the coil 10 in a state in which an alignment of the windings 10A is maintained,
wherein one holding tool 30 of the pair of holding tools 30 holds the first storage section 11a of the coil 10, and the other holding tool 30 of the pair of holding tools 30 holds the second storage section 11b of the coil 10, and
wherein when mounting the coil 10 in the slots 22, each holding space 32a communicates with an interior of the slot 22 through the axial opening 23 via the holding tool 30".

In other words, the holding tools 30 according to claim 1 are used throughout the entire process, from the manufacturing of the coils 10 to be mounted in slots 22 between a plurality of teeth 21 of a core 20 for an electromechanical device that converts electrical and mechanical energy, to the mounting or insertion of the coils 10 into the slots 22 between the teeth 21. During this process, the holding tools 30 facilitate manufacturing of the coils 10 and the electromechanical device using the coils 10, facilitate mounting or insertion of the coils 10 into the slots 22, and also increases the concentration of windings in each slot 22, ultimately contributing to the manufacturing of an armature 100 as shown in FIG. 1 or FIG. 22 with little inductance non-uniformity.

As shown in FIGS. 2 (b), 3 (a), and 4 to 6, the holding tool 30 according to claim 1 has a basic configuration which includes at least two base plates 32 that are coupled at one end so as to be openable, an exit 31 formed at the other end of the base plates 32, and a holding space 32a openable at the exit 31.

As shown in FIGS. 4 (a) to 4 (d), 5, and 6, the at least two base plates 32 are of a generally rectangular shape, and are coupled at the opposite side of the exit 31 by hinges or the like so as to be able to open and close. Accordingly, they can assume two aspects, as shown in solid lines and phantom lines in FIGS. 4 (a) to 4 (c) and 5, wherein one base plate 32 is closed (solid lines) or open (phantom lines) relative to the other. The reason why "at least" two base plates 32 are mentioned here is that, while two base plates 32 are sufficient for a holding tool 30 as shown in FIG. 4, the holding tool 30 may also be configured as shown in FIG. 5, in which two base plates 32 are provided on either side of a center base plate 32 so as to be able to open and close, thereby forming two holding spaces 32a for the windings 10A.

When one base plate 32 is closed relative to the other, at least one holding space 32a for windings 10A is formed between the base plates 32. When the base plates 32 are closed, the windings 10A will be held in the holding space 32a with their alignment maintained. When the base plates 32 are opened, the holding space 32a will be open, at which time the holding tool 30 will have one of its base plates 32 inserted into an insertion groove 41 of a bobbin 40 as shown in FIG. 2 (b) or 8 to prepare to receive the first storage section 11a or second storage section 11b of the coil 10.

Such holding tools 30 are used in a manufacturing method to manufacture coils 10, and to insert or mount the coils 10 into the slots 22 of a core 20 according to a mounting method described later. Although the coils 10 are mounted to a core 20 of an armature as shown for example in FIG. 1, it goes without saying that they may also be applied to a rotor of an electromechanical device. Moreover, so long as the core 20 or rotor has a plurality of teeth 21 to which the coils 10 are mounted and slots 22 between the teeth 21, the core 20 or rotor may be of either split type or block type.

As shown in FIGS. 2 (a) and 3 (a), each coil 10 has first and second storage sections 11a and 11b that are to be stored in the slots 22 described later, and first and second coil ends 12a and 12b that are continuous between the first and second storage sections 11a and 11b and are arranged on the outside of the core 20, and the parts of the coil 10 constituting the first storage section 11a and the second storage section 11b are held by two holding tools 30 as described above. In addition, in each coil 10, as shown in FIG. 2 (b), between a first radial section formed by a winding-start section 10a and a second radial section formed by a winding-end section 10b of the windings 10A constituting the coil, the radii of the winding lap sections formed by the windings 10A change in a continuous or stepped manner.

This coil 10 is easily manufactured by, as shown in FIG. 2, winding one or more windings 10A (FIG. 2 shows a case where two windings 10A are wound simultaneously) around a bobbin 40. The coil 10 can thus be formed by winding the windings 10A around a bobbin 40 that is cylindrical or frame-shaped, such that between a first radial section formed by a winding-start section 10a and a second radial section formed by a winding-end section 10b of the windings 10A constituting the coil, the radii of the winding lap sections formed by the windings 10A change in a continuous or stepped manner, as shown in FIG. 2 (b).

As described above, the coils 10 are formed by being wound around a bobbin 40, and can thus be manufactured without the need for a complicated manufacturing method or device.

In the bobbin 40 for making the radii of the winding lap sections formed by the windings 10A change in a continuous manner there are formed two insertion grooves 41 along the axial direction of the bobbin 40, as shown in FIG. 2 (b). Thus, by inserting one base plate 32 of a holding tool 30 into each insertion groove 41 and closing the other base plate 32, the windings 10A wound around the bobbin 40 will be held at the first and second storage sections 11a and 11b such that their alignment to each other is maintained.

As shown in FIGS. 4 to 7, the holding tools 30 used in an embodiment described later consist of at least two base plates 32 coupled at one side so as to be able to open and close, and after inserting one of the base plates 32 into the insertion groove 41, the second base plate 32 is closed so as to hold the windings 10A. Accordingly, an exit 31 is formed between these two base plates 32, through which the held windings 10A can be ejected.

These holding tools 30 are then moved relative to the bobbin 40 while holding the first and second storage sections 11a and 11b of the windings 10A to remove and separate the coil 10 from the bobbin 40. In other words, moving the bobbin 40 and the holding tools 30 relative to each other results in a coil 10 with the windings 10A constituting the first and second storage sections 11a and 11b being held in parallel to each other by the holding tools 30.

This embodiment employs a plurality of bobbins 40 that are integrated in the axial direction, having the large diameter ends paired together and the small diameter ends paired together. In this case, the windings 10A can be cut off at locations other than between adjacent coils 10 so as to form a chain of two coils 10, or a chain of four coils 10 as shown in FIG. 26 (b), in which the coils 10 are electrically connected at the winding-start sections 10a and winding-end sections 10b.

Meanwhile, in a case in which the windings 10A between winding-start sections 10a and the winding-end sections 10b are made to change in a stepped manner, a bobbin 40 as shown in FIG. 8 is employed, which is formed in a continuous manner of a cylinder having an outer diameter that changes in three steps. Of course, the surface of the cylinder forming each step is parallel to the axis of the bobbin 40, such that windings 10A wound around these cylinder surfaces cannot be displaced. The configuration of any other parts of this bobbin 40 that changes in a stepped manner are similar to those of the bobbin shown in FIG. 2 (b).

Immediately upon completion of the coil 10, the two holding tools 30 hold the coil 10 at two locations, as shown in FIG. 2 (a), such that the windings 10A constituting the coil 10 do not unravel. As mentioned above, the parts held by the holding tools 30 are the first and second storage sections 11a and 11b, and the parts that protrude from the holding tools 30 are the first and second coil ends 12a and 12b which are electrically continuous between the first and second storage sections 11a and 11b. A twisted section 10d as described below is formed in the first and second coil ends 12a and 12b.

When the holding tools 30 are rotated relative to one another while they hold the first and second storage sections 11b, a twisted section 10d as shown for example in FIGS. 9 to 11 is formed in the first and second coil ends 12a and 12b. In this twisted section 10d, with the section with the smallest radius as the winding-start section 10a, increasing the angle of rotation of the holding tools 30 will cause the windings to twist into the twisted section 10d in order from the winding-start section 10a, and around the twisted section 10d there will be formed a space in which a twisted section 10d of another coil 10 can be arranged.

Then, when the coil 10 is mounted, the twisted section 10d of another coil 10 will fit closely in the twisted section 10d of the first coil 10 without gaps, such that, as shown in FIGS. 1 (a) and 22 (a), the windings 10A will be arranged with a minimum length of the coil ends, which not only reduces copper or iron loss in the coil ends, but also, as shown in FIGS. 1 (b) and 22 (b), allows for a significantly lower height of the coil ends than in the example shown in FIG. 26 (a). The total volume of a resultant electromechanical device (e.g. a motor) can therefore be made smaller.

Further, by applying a force to the center of the first coil end 12a and the second coil end 12b while they are being held in parallel to each other by the holding tools 30, a curved section 10c as shown in FIG. 23 (a) will be formed. At this time, with the radii of the winding sections formed by the windings 10A changing in a continuous or stepped manner between the first radial section formed by the winding-start section 10a and the second radial section formed by the winding-end section 10b of the windings 10A, a next coil receiver 10e as shown in FIG. 23 (c) can also be formed on the lower side of the first and second coil ends 12a and 12b. When mounting the coil 10, the next coil receiver 10e of another coil 10 will be inserted into the next coil receiver 10e. This not only reduces copper loss or iron loss in the coil ends, but also, as shown in FIGS. 1 (b) and 22 (b), allows for a significantly lower height of the coil ends than in the conventional example shown in FIG. 26 (a).

The coils 10 made as described above are inserted into the slots 22 formed between the teeth 21 of the core 20. There are two exemplary types of insertion methods or mounting methods: A one slot-one coil type, and a one slot-two coils type. These methods will be described individually below.

(One Slot-One Coil Mounting Method)

In this type of mounting method, one coil 10 is inserted into one slot 22 of the core 20 of an electromechanical device, as shown in FIG. 24, with the aim of making an armature 100 as shown in FIG. 22. First, as shown in FIG. 23, a curved section 10c is formed in each of the first and second coil ends 12a and 12b located between two holding tools 30 holding one coil 10.

As a result, as shown in FIGS. 23 (a) to 23 (c), since the first radial section formed by the winding-start section 10a and the second radial section formed by the winding-end section 10b of the windings 10A change in a continuous or stepped manner with respect to the holding tools 30, a next coil receiver 10e in which the winding-end section 10b is the widest opening is naturally formed on the lower side of the curved section 10c between each of the first and second coil ends 12a and 12b and the holding tools 30, as shown in FIG. 23 (c).

Employing the coil 10 in which this curved section 10c is formed, the exits 31 of the holding tools 30 holding the first coil 10 are aligned with the axial openings 23 of two respective slots 22 that are separate from each other by a specific distance. Next, the first and second storage sections 11a and 11b held by the respective holding tools 30 are pushed into the slots 22 through the exits 31.

The next coil 10 is then inserted into the next slot 22 after the slot 22 in which the first coil 10 is mounted, such that the curved section 10c of the next coil 10 is inserted in the curved section 10c of the first coil 10. Since the second coil 10 in this case also has a curved section 10c, this curved section 10c will be stored without gaps within the curved section 10c of the first coil 10.

When subsequent coils 10 are mounted in a similar manner onto a core 20, the curved sections 10c of for example the first coil ends 12a protrude inwardly, where the rotor of the core 20 is to be arranged, and the curved sections 10c are therefore bent toward the opposite side, as shown in FIGS. 23 (c) and 24. In a case where the coils 10 are mounted onto a rotor, the curved sections 10c of the first and second coil ends 12a and 12b do not need to be bent, as they protrude toward the center.

The curved sections 10c in this one slot-one coil method correspond to the next coil receivers 10e of the one slot-two coils method described below.

(One Slot-Two Coils Mounting Method)

This type of mounting method differs from the one slot-one coil type method described above. As shown in FIG. 20, the first storage section 11a of a first coil 10 and the second storage section 11b of a second coil 10 are inserted or mounted in each of a plurality of slots 22 of a rotor 20, with the aim of making an armature 100 as shown in FIG. 1. In this mounting method, as shown in FIG. 20 (a), the first and second storage sections 11a and 11b of the first coils 10 are respectively stored in a first slot 22, and another slot 22 separate from the first slot 22 by a specific distance. At this time, the windings 10A constituting the first and second storage sections 11a and 11b are in an unraveled state within the slots 22, leaving space for the insertion of the first and second storage sections 11a and 11b of subsequent coils 10.

In this mounting method, the exit 31 of the holding tool 30 holding the first storage section 11a of the coil 10 is aligned with the axial opening 23 of one slot 22, and the first storage section 11a is inserted into the slot 22. In a case where the second storage section 11b of another coil 10 has not yet been inserted into the slot 22, the windings 10A constituting the first storage section 11a will be stored in an unraveled state in the slot 22, so that when the second storage section 11b of a subsequent coil 10 is forcefully inserted into the slot 22, the first storage section 11a of the first coil 10 and the second storage section 11b of the subsequent coil 10 will be packed tightly together. Insertion is carried out by means of an ejecting plate that pushes out the windings 10A from the holding tool 30, but it can also be carried out automatically by the elastic force inherent in the windings 10A.

Next, by twisting the holding tool 30 holding the second storage section 11b of the coil 10 relative to the holding tool 30 holding the first storage section 11a, a twisted section 10d as exemplarily shown in FIG. 9 is formed in the first coil end 12a and in the second coil end 12b. This twisted section 10d is formed by such relative rotation of two holding tools 30 in the state shown in FIG. 3 (a).

When this twisted section 10d is formed, between a first radial section formed by a winding-start section 10a and a second radial section formed by a winding-end section 10b of the windings 10A, the radii of the winding lap sections formed by the windings 10A change in a stepped manner. Therefore, in the twisted section 10d, the winding sections will be twisted, in upward order, from the winding section with the smallest radius to the winding section with the largest radius, and around the first coil end 12a and second coil end 12b of the first coil 10 will be formed a space, in other words a next coil receiver 10e, in which a twisted section 10d of a second coil 10 can be arranged in a closely adhered state, as shown in FIG. 10 (b).

Next, the exit 31 of the holding tool 30 holding the second storage section 11b of the coil 10 is aligned with the axial opening 23 of another slot 22 separate from the aforementioned slot 22, and the second storage section 11b is pushed into this slot 22 by the ejecting plate of the holding tool 30.

The next coil 10 is then inserted into the other slot 22 separate from the slot 22 in which the previous coil 10 is mounted, while the twisted section 10d and next coil receiver 10e formed through the aforementioned process are overlapped with the twisted section 10d and next coil receiver 10e of the previous coil 10. This process is then repeated.

At this time, the center of the twisted section 10d of the previous coil 10 is more constricted due to the twisting than the peripheral sections, such that the peripheral sections of the twisted section 10d are in an expanded state. Therefore, in the vicinity of the twisted section 10d of the coil 10 there will be formed a space, in other words a next coil receiver 10e. The twisted section 10d of the next coil 10, which is to be inserted into a next slot 22 separate from the first slot 22 by the pitch between the slots 22, is to be stored in this next coil receiver 10e in a closely adhered state. In other words, the twisted section 10d of the next coil 10 is arranged so as to be entwined with the twisted section 10d of the previous coil 10, and when insertion of the previous coil 10 and the adjacent next coil 10 is finished, the twisted sections 10d and next coil receivers 10e are in a closely adhered state.

In the final step of the insertion process where two distributedly wound coils 10 are inserted into a plurality of slots 22 in the "one slot-two coils" configuration, there will naturally be cases where the previously inserted coils 10 become obstructions. By final step is meant a step in which, when the first storage sections 11a of the first to seventh coils 10 are inserted in order into the first to seventh slots 22, respectively, the second storage sections 11b of the final $n^{th}$ to n-$6^{th}$ coils 10 are inserted into the final $n^{th}$ to n-$6^{th}$ slots 22.

Thus, in the final step of the insertion process, with respect to a slot 22 into which the second storage section 11b is to be inserted but a first storage section 11a of the previous coil 10 has already been inserted, the first storage section 11a is temporarily taken out and the second storage section 11b of the next coil 10 is inserted and pushed into the outer side of the slot 22, while the first storage section 11a is reinserted so as to be at the inner side.

A coil mounting device 50 as shown in FIG. 12 is used for the insertion of the coils 10 into the slots 22. This coil mounting device 50 includes a coil shelf 51 that can accommodate a plurality of coils 10 held in holding tools 30 and a core rotator 52 that sequentially rotates and positions the core 20, and is configured to transport the coils 10 held in the holding tools 30 from the coil shelf 51 to the core 20 supported by the core rotator 52. The coils 10 are stored in the coil shelf 51 in a manner shown in FIG. 12.

The coil mounting device 50 additionally includes a first assist arm 53a and a second assist arm 53b, which are individually rotated and moved into and out of the core 20 on the core rotator 52, and are configured to operate depending on the state of the coils 10 so as to twist for example the second storage section 11b of each coil 10 to form the twisted section 10d. At this time, the holding tools 30 according to the present invention are used.

As described above, the coil 10 made using the holding tools 30 according to claim 1 consists of one or more windings 10A that are wound by distributed winding, and is held at two sections by two holding tools 30. From the completion of the coil 10 and until it has been stored in a specific slot 22 of the core 20, these holding tools 30 maintain the alignment of the distributedly wound windings 10A, in other words prevent them from unravelling, allowing for deformation of the first and second coil ends 12a and 12b of the coil 10 until it has been stored, without altering the shape of the first and second storage sections 11a and 11b.

The coil 10 is wound by distributed winding such as proposed in Japanese Unexamined Patent Application Publication No. 2009-195005, in which coils are wound across a plurality of slots and coils which are in phase or out of phase with each other are overlapped at the coil ends, and has first and second storage sections 11a and 11b that are stored in two respective slots 22. As shown in FIGS. 2 (a) and 3 (a), these first and second storage sections 11a and 11b are held by the holding tools 30, and the first and second coil ends 12a and 12b are respectively exposed at the upper and lower sides of the holding tools 30 in the drawing. Further, as shown in FIG. 2 (a), both ends of the windings 10A are left protruding from the coil 10 for electrically connecting the coil 10 to another coil 10 or to a power supply.

The coils 10 may be formed as a plurality of coils 10 being electrically continuous with each other. In this case, as shown in FIG. 10, connecting wires 10C are provided projecting at one end surface side (a determined side) of the core 20. These connecting wires 10C make the coils 10 electrically continuous with each other. Further, in the coils 10 electrically connected by the connecting wires 10C, the connecting lines 10C of the coils 10 at either end are used respectively as a power line and a ground wire. Of course, the windings 10A, which constitute the coils 10 apart from the connecting wires 10C, are used as a first storage section 11a and a second storage section 11b, and a first coil end 12a and a second coil end 12b, described below, and the windings 10A constituting each of these parts are electrically continuous.

Such a coil 10 has a basic configuration in which one or more windings 10A are wound around a cylinder or frame to form the first and second storage sections 11a and 11b that are to be stored in the slots 22, and the first and second coil ends 12a and 12b that are continuous between the first and second storage sections 11a and 11b and are arranged on the outside of the core 20, and wherein the first storage section 11a and the second storage section 11b of the coil 10 are held by the two holding tools 30 in a state maintaining the alignment of the windings 10A. Accordingly, this coil 10 enables the following:
(A) Both round wires and rectangular wires may be used as the conducting wires that constitute the coils, with no limitations on the shape of the cross-section of the wires.

It is important that the sections of the coil 10 that constitute the first and second storage sections 11a and 11b are held by the holding tools 30 such that the alignment of the windings 10A is maintained. This is because when a plurality of coils 10 are inserted between the teeth 21, in a case where a curved section 10c is formed in the first and second coil ends 12a and 12b (i.e. when one coil is stored in one slot), or in a case where a twisted section 10d is formed in the first and second coil ends 12a and 12b and the twisted sections 10d of each coil 10 are overlapped with each another (i.e. when two coils are stored in one slot), the first and second coil ends 12 a and 12b of the first coil need to be naturally deformed such that the first and second coil ends 12a and 12b of the next coil 10 can overlap without gaps. Accordingly, these coils 10 made using the holding tools 30 enable the following: (D) The space factor of the coils in the slots can be made high.

Both in the case where one coil is stored in one slot, and in the case where two coils are stored in one slot, the distributedly wound coils 10 are stored after being put in the state shown in FIG. 9 (b). In other words, looking at one coil 10, the position of the first storage section 11a stored in the first slot 22 is on the opposite side relative to the second storage section 11b stored in the second slot 22 separate from the first slot by a certain distance, due to the twisted section 10d of the coil 10.

In this state, when the first storage section 11a and the second storage section 11b are on opposite sides due to the twisted section 10d of the coil 10, when the first section of the windings 10A of the first storage section 11a stored in the first slot 22 is on the inner side, as shown in FIG. 20 (a), the last section of the windings 10A of the second storage section 11b stored in the second slot 22 separate from the first slot by a certain distance will be located on the outer side of the second slot 22.

In general, when a distributedly wound coil without a twisted section is stored in two slots, the first section of the windings of the first storage section stored in a first slot and the last section of the windings of the second storage section, stored in a second slot separate from the first slot by a certain distance, will be located in the same position of each slot. Since the slots, both on the rotor side and on the core side, are formed radially relative to the center of the armature, the measurements of their inner sides and the measurements of their outer sides are different. Thus, when a distributedly wound coil without a twisted section is stored within two slots, the windings will be stored in the same position, which causes inductance non-uniformity in the inner and outer windings (wires), leading to an overall drop in efficiency of the coil. The reason for this is that when an identical voltage is applied to the wires simultaneously, a greater current will flow in the wires with lower inductance, and this inductance non-uniformity will work toward reducing overall efficiency of the coil.

In the coil 10, the presence of the twisted section 10d formed by the holding tools 30 according to the present invention means that, as exemplarily shown in FIG. 10 (b) or FIG. 20 (a), when the first section of the windings 10A of the first storage section 11a stored in a first slot 22 is on the inner side, the last section of the windings 10A of the second storage section 11b stored in the second slot 22 separate from the first slot by a certain distance will be located on the outer side of the second slot 22, which reduces or suppresses the inductance non-uniformity in the parts (wires) of the coil 10, so that more magnetic flux is generated.

When the inductance non-uniformity in the parts (wires) of the coil 10 is reduced or suppressed, an overall drop in efficiency of the coils 10 is suppressed. As a result, the efficiency of an electromechanical device using these coils 10 can be improved, and the electromechanical device itself will have high output, and can be made smaller and lighter.

As described above, in the coils 10, the presence of the twisted section 10d formed by the holding tools 30 according to the present invention reduces or suppresses inductance non-uniformity in the parts (wires), which thereby enables an electromechanical device in which the coil 10 is used to have high output, and to be made smaller and lighter. As a result, the coil 10 enables the following:
(F) Inductance non-uniformity in each winding can be equalized to increase coil efficiency when used in an electromechanical device.

Employing the coil 10 formed by the holding tools 30 according to claim 1 enables the following:
(A) Both round wires and rectangular wires may be used as the conducting wires that constitute the coils, with no limitations on the shape of the cross-section of the wires.
(B) Manufacturing and handling of the coils is easy.
(C) Insertion of the coils into the slots can be done easily.
(D) The space factor of the coils in the slots can be made high.
(E) The coil ends can be made small for use in an electromechanical device.
(F) Inductance non-uniformity in each winding can be equalized to increase coil efficiency when used in an electromechanical device.
(G) As a result, the armature can be made compact and efficient, and it is also easy to manufacture the electromechanical device.

Accordingly, the holding tools 30 according to claim 1 are capable of forming a twisted section 10d in the first and second coil ends 12a and 12b while maintaining the alignment of the windings constituting the first and second storage sections 11a and 11b of the coil 10, enabling easy manufacturing and handling of the coils, easy insertion into the slots and a high space factor of the windings in the slots, resulting in smaller coil ends when used in an electromechanical device.

In order to solve the aforementioned problems, the invention according to claim 2 employs the following means with respect to the holding tool 30 for an electromechanical device according to claim 1:
"A stopper 31a is provided to at least one of the base plates 32 near the exit 31 to prevent the windings 10A in the holding space 32a from popping out."
In order to solve the aforementioned problems, the invention according to claim 2 employs the following means with respect to the coil 10 for an electromechanical device according to either claim 1 or claim 2:

"The exit 31 of each holding tool 30 is provided with lips 36 that guide the coil 10 into the axial opening 23 of the slot 22."

The two holding tools according to claim 1 as described above hold a distributedly wound coil 10 at two locations, and from completion of the coil 10 until it has been stored in a certain slot of the core 20, these holding tools 30 prevent the distributedly wound windings 10A from unraveling, and enable deformation of the first and second coil ends 12a and 12b of the coil 10 before storage, without causing deformation of the first and second storage sections 11a and 11b. The holding tools 30 also maintain the alignment of the windings 10A constituting the first and second storage sections 11a and 11b.

The holding tools 30 according to claim 1 as described above sandwich the windings 10A constituting the first and second storage sections 11a and 11b of the coil between the base plates 32, and the friction thereof is sufficient to maintain the alignment of the windings 10A. However, this may not be enough in case another force that opposes this friction is applied from somewhere else. Therefore, the holding tools 30 according to claim 2 have a stopper 31a provided near the exit 31 of at least one of the base plates 32 to prevent the windings 10A in the holding space 32a from popping out.

As shown in FIGS. 4 (b) to 4 (d), there are various forms of the stopper 31a, but in order to stop the windings 10A in the holding space 32a from popping out, providing the stopper 31a near the exit 31 of the holding tool 30 is the most suitable arrangement. This is because the exit 31 is formed at the end of the mutually opening and closing base plates 32 from where the windings 10A are inserted.

In the example shown in FIG. 4 (b), a fixed stopper 31a is formed at the end of the base plate 32 opposite the base plate 32 that is inserted into the insertion groove 41 of the aforementioned bobbin 40. In the example shown in FIG. 4 (c), a stopper 31a is formed so as to be able to open and close at the end of the base plate 32 opposite the base plate 32 that is inserted into the insertion groove 41 of the bobbin 40. Finally, in the example shown in FIG. 4 (d), an insertion hole is formed near the exit 31 of the mutually opening and closing base plates 32 32, and the stopper 31a (in the form of a pin) is configured to be inserted into this insertion hole to function as a stopper.

In all of the cases shown in FIGS. 4 (b) to 4 (d), the windings 10A in the holding space 32a are prevented from popping out by the stopper 31a even when a force that would make the windings 10A pop out from the holding space 32a is applied from somewhere else. All of these examples thus maintain the alignment of the windings 10A.

Accordingly, the holding tools 30 according to claim 2 have stoppers 31a that prevent the windings 10A in the holding space 32a from popping out during operation, and allow for a twisted section 10d to be formed in the first and second coil ends 12a and 12b while maintaining the alignment of the windings constituting the first and second storage sections 11a and 11b of the coil 10, thereby facilitating manufacturing of coils, allowing for easy insertion of coils into the slots with a high space factor of windings in the slots, and consequently enabling the coil ends of the coil to be made smaller when used in an electromechanical device.

Effects of the Invention

As described above, the present invention has the following structural features:

"A pair of holding tools 30 configured to hold a coil 10 to be mounted in slots 22 between a plurality of teeth 21 of a core 20 for an electromechanical device that converts electrical and mechanical energy, each holding tool 30 comprising:

at least two base plates 32 openably coupled at one end;

an exit 31 formed between the other ends of the base plates 32, the exit 31 capable of being aligned with an axial opening 23 of one slot 22; and a holding space 32a that is openable at the exit 31 and that, when the base plates 32 close, holds windings 10A constituting the coil 10 in a state in which an alignment of the windings 10A is maintained, wherein one holding tool 30 of the pair of holding tools 30 holds the first storage section 11a of the coil 10, and the other holding tool 30 of the pair of holding tools 30 holds the second storage section 11b of the coil 10, and wherein when mounting the coil 10 in the slots 22, each holding space 32a communicates with an interior of the slot 22 through the axial opening 23 via the holding tool 30".

Due to these features, the present invention provides a holding tool 30 that allows for a twisted section 10d to be formed in the first and second coil ends 12a and 12b while maintaining the alignment of the windings constituting the first and second storage sections 11a and 11b of the coil 10, thereby facilitating manufacturing of coils, allowing for easy insertion of coils into the slots with a high space factor of windings in the slots, and consequently enabling the coil ends of the coil to be made smaller when used in an electromechanical device.

BRIEF DESCRIPTION OF THE DRAWINGS

FIG. 1 shows a core for constructing an armature 100 according to an embodiment of the present invention, in which two coils 10 are mounted in one slot, where (a) is a plan view and (b) is a front view;

FIG. 3 shows the coil 10, where (a) is a front view of two holding tools 30 holding the windings 10A when arranged in one plane, and (b) is a representative plan view of seven windings 10A;

FIG. 7 shows a holding tool 30 having a swinging plate 33 provided with a stopper 31a, where (a) is a side view of a state where the exit 31 is closed by the stopper 31a, and (b) is a side view of a state where the swinging plate 33 is rotated in an opening direction of the stopper 31a to open the exit 31;

FIG. 9 shows a coil 10 being held by the holding tools 30, where (a) is a front view of two holding tools 30 holding the windings 10A arranged in parallel with each other, and (b) is a representative plan view of six windings 10A;

FIG. 20 illustrates the positional relationship when two coils 10 are stored in slots 22, where (a) is a partial plan view of the core 20 when the first coil 10 is inserted, and (b) is a partial plan view of the core 20 when the second coil 10 is inserted;

FIG. 22 shows a core wherein one coil 10 is mounted in one slot, where (a) is a plan view and (b) is a front view;

FIG. 26 shows art proposed in Japanese Unexamined Patent Application Publication No. 2009-195005, where (a) is a perspective view of a stator, and (b) is a perspective view of a coil.

DESCRIPTION OF THE EMBODIMENTS

Figure 2:
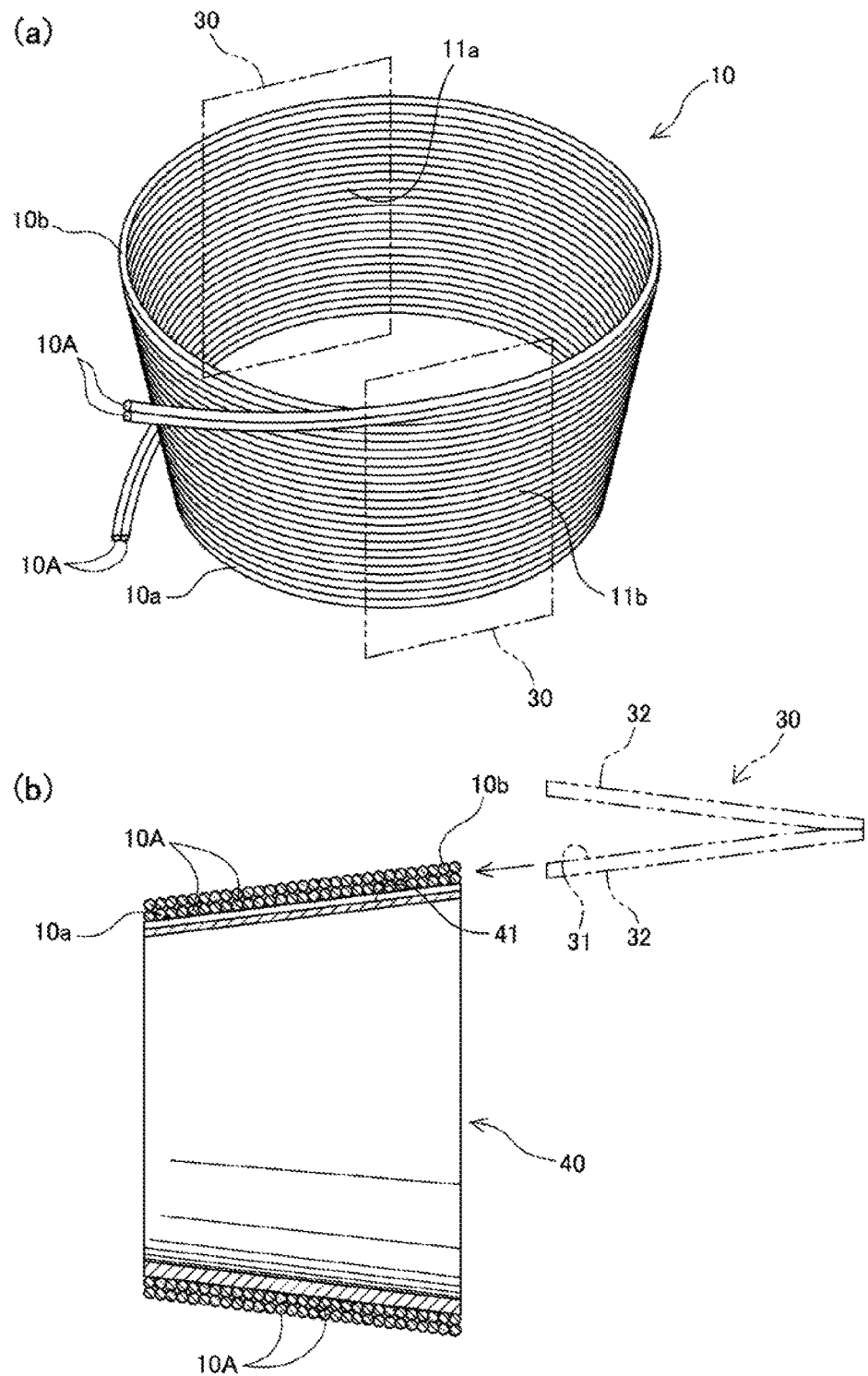
FIG. 2 shows a coil 10 made using the holding tools 30 according to an embodiment of the invention, where (a) is a perspective view, and (b) is a cross-sectional view illustrating the manufacturing method.

The invention recited in the claims as described above will now be described in terms of the embodiments illustrated in the drawings. FIGS. 2 (b), 3 (a), and 4 to 6 show a holding tool 30 according to claim 1, which holding tool 30 includes at least two base plates 32 that are coupled at one end so as to be openable, an exit 31 formed at the other end of the base plates 32, and a holding space 32a openable at the exit 31.

Figure 4:
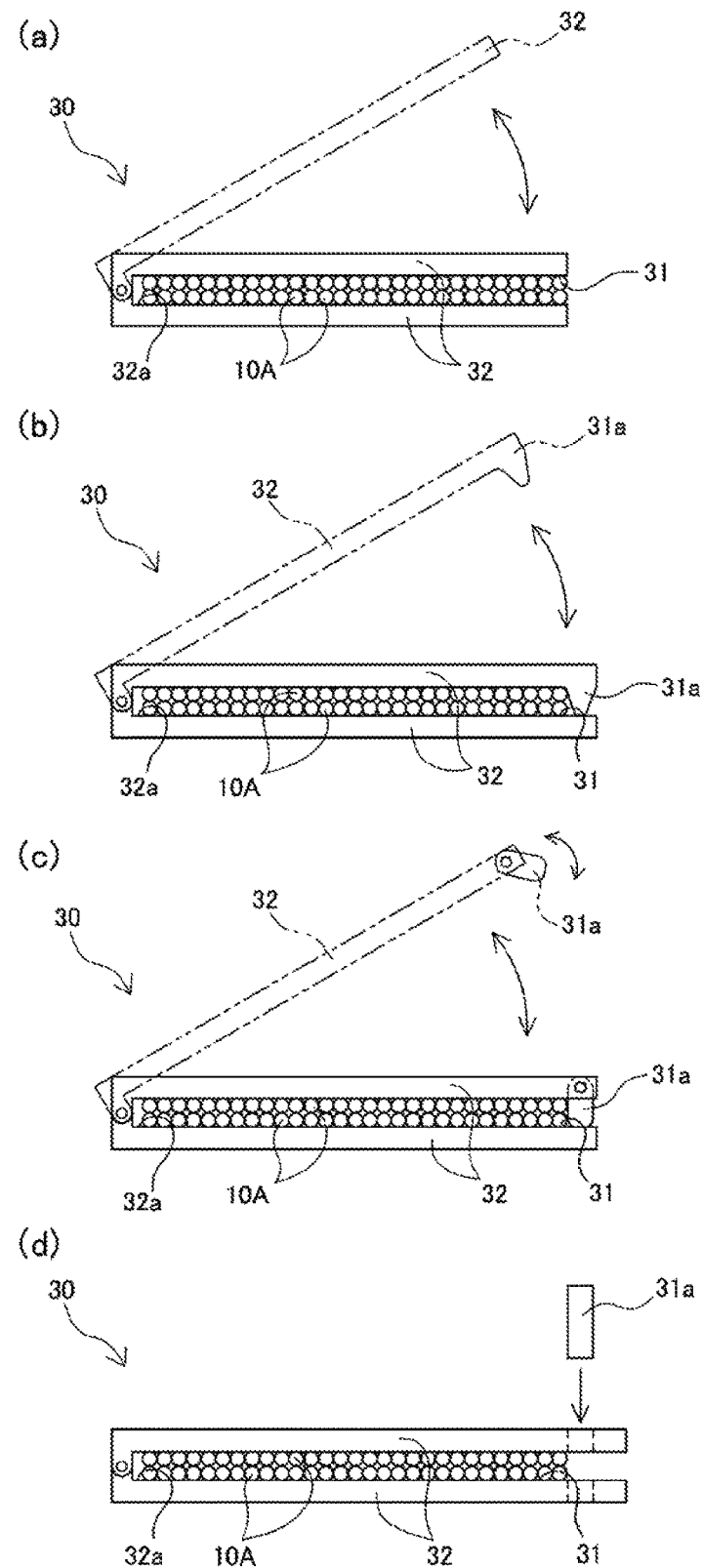
FIG. 4 is a cross-sectional view of the holding tool 30 showing a side view taken along line 2-2 in FIG. 3 (a), where (a) is a side view of an example without a stopper 31a, (b) is a side view of an example with a stopper 31a provided near the exit 31, (c) is a side view of an example with a stopper provided so as to be able to open and close near the exit 31, and (d) is a side view of an example with a stopper 31a in the form of a pin to be inserted in an insertion hole provided near the exit 31.
Figure 5:
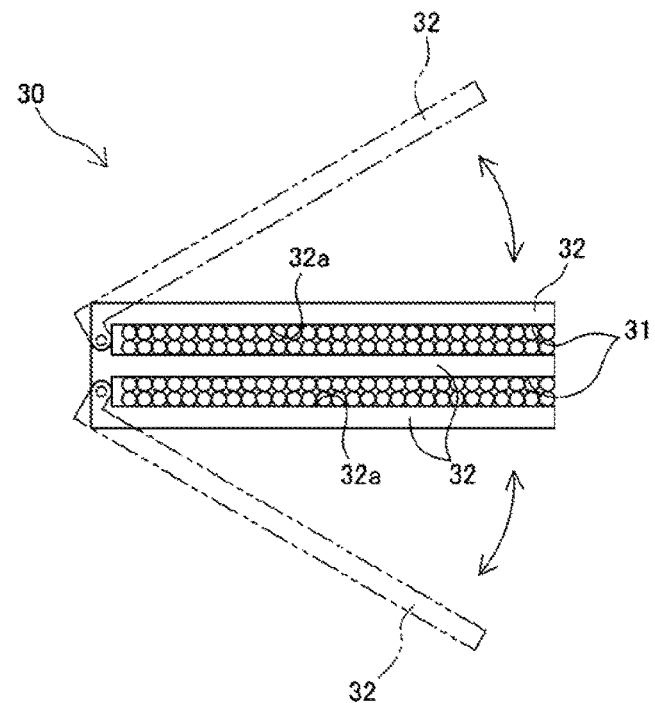
FIG. 5 is a side view of a holding tool 30 where two base plates 32 are provided so as to open and close on either side of a center base plate 32.

As shown in FIGS. 4 (a) to 4 (d), 5, and 6, the at least two base plates 32 are of a generally rectangular shape, and are coupled at the opposite side of the exit 31 by hinges or the like so as to be able to open and close. Accordingly, they can assume two aspects, as shown in solid lines and phantom lines in FIGS. 4 (a) to 4 (c) and 5, wherein one base plate 32 is closed (solid lines) or open (phantom lines) relative to the other. The reason why "at least" two base plates 32 are mentioned here is that, while two base plates 32 are sufficient for a holding tool 30 as shown in FIG. 4, the holding tool 30 may also be configured as shown in FIG. 5, in which two base plates 32 are provided on either side of a center base plate 32 so as to be able to open and close, thereby forming two holding spaces 32a for the windings 10A.

When one base plate 32 is closed relative to the other, at least one holding space 32a for windings 10A is formed between the base plates 32. When the base plates 32 are closed, the windings 10A will be held in the holding space 32a with their alignment maintained. When the base plates 32 are opened, the holding space 32a will be open, at which time the holding tool 30 will have one of its base plates 32 inserted into an insertion groove 41 of a bobbin 40 as shown in FIG. 2 (b) or 8 to prepare to receive the first storage section 11a or second storage section 11b of the coil 10.

Figure 6:
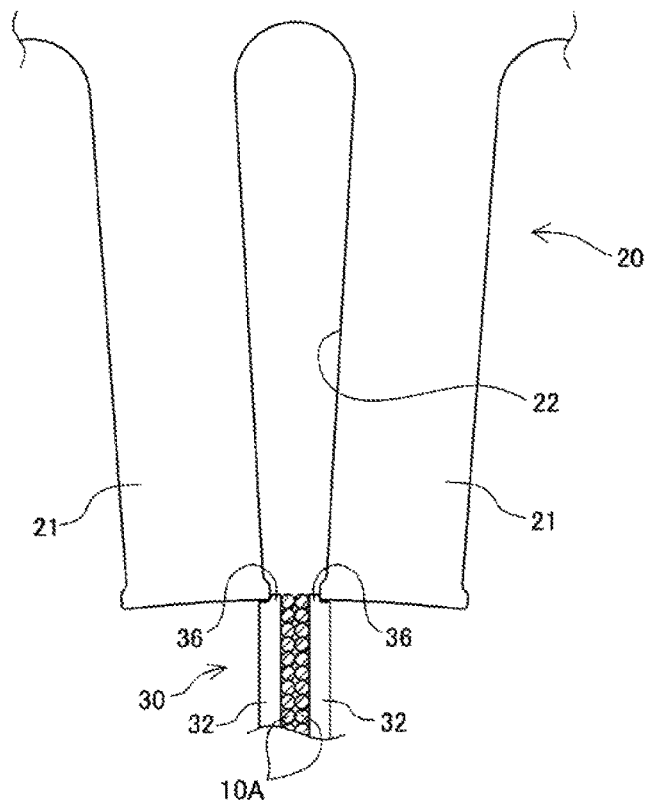
FIG. 6 is a partial enlarged plan view where the exit 31 of the holding tool 30 is provided with lips 36 that guide the windings into the slot 22.

FIG. 6 shows a partial enlarged plan view in which the exit 31 of the holding tool 30 according to an embodiment of this invention is provided with lips 36 that guide the windings into the entrance of the slot 22. The lips 36 protrude (in this embodiment by about 0.5 mm to 1.0 mm) from the edges of the base plates 32 near one side (the side in the same direction as the axial direction of the hinge that openably couples the base plates 32 together) of the base plate 32 near the exit 31, as shown in FIG. 6. In addition, the space between the lips 36 is made equal to the width of the axial opening 23 of the slot 22, such that the lips 36 of the closed base plates 32 enter the axial opening 23 of the slot 22 in question to guide the windings 10A that were in the holding space 32a of the holding tool 30 so that the windings 10A can smoothly enter the slot 22.

FIG. 1 shows a plan view and a front view of a stator 100 employing coils 10 formed using the holding tools 30 according to an embodiment of this invention, constructed by insertion of two distributedly wound coils 10 into one slot 22. Meanwhile, FIG. 22 shows a plan view and a front view of a stator 100 employing the same coils 10 constructed by insertion of one distributedly wound coil 10 into one slot 22. These stators 100 constitute electromechanical devices that convert electrical energy and mechanical energy, such as a motor or a generator, and have a rotor not shown here stored at their center.

Figure 25:
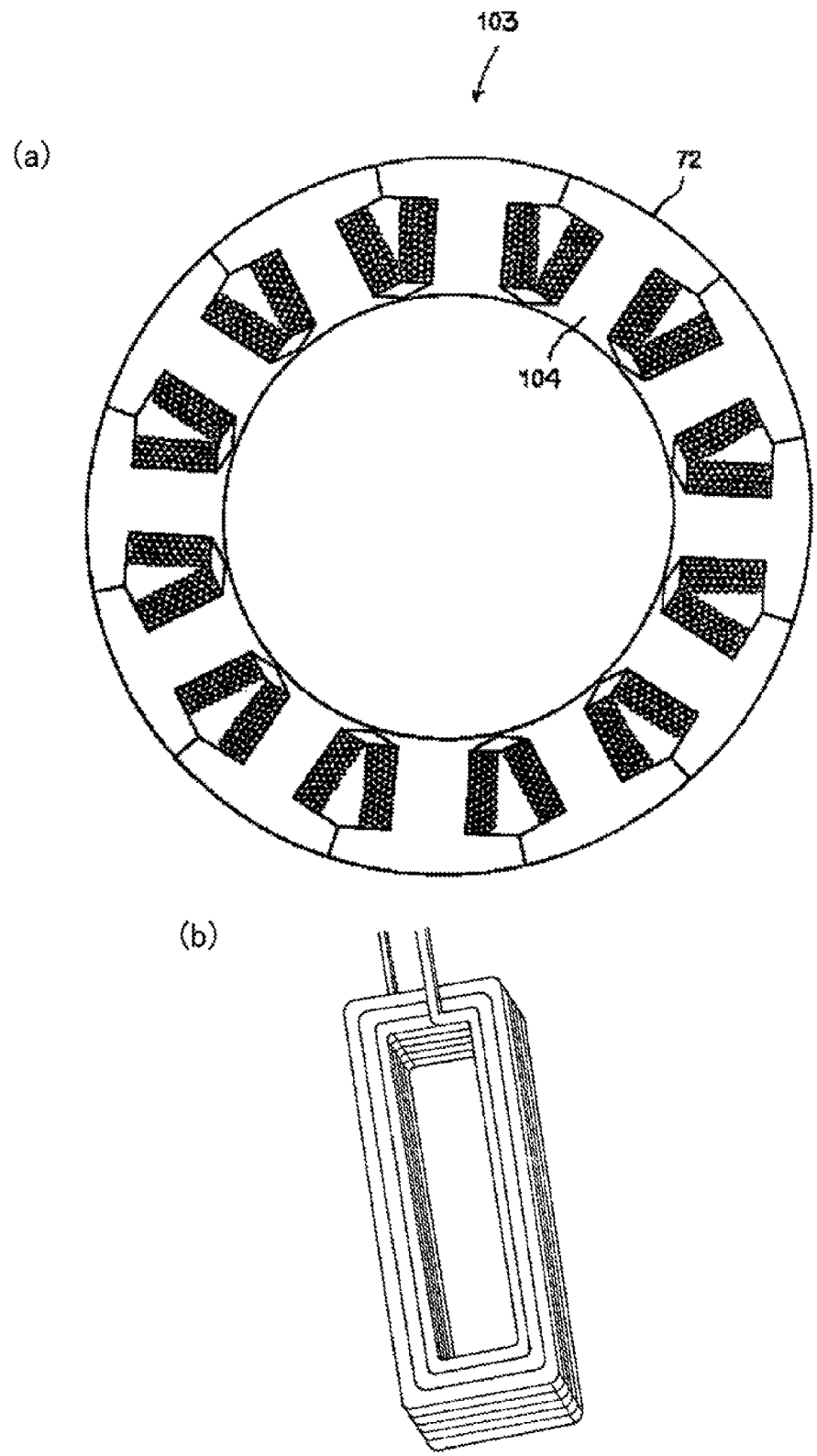
FIG. 25 shows art proposed in Japanese Unexamined Patent Application Publication No. 1999-312621, where (a) is a plan view of a stator, and (b) is a perspective view of a coil.
Figure 27:
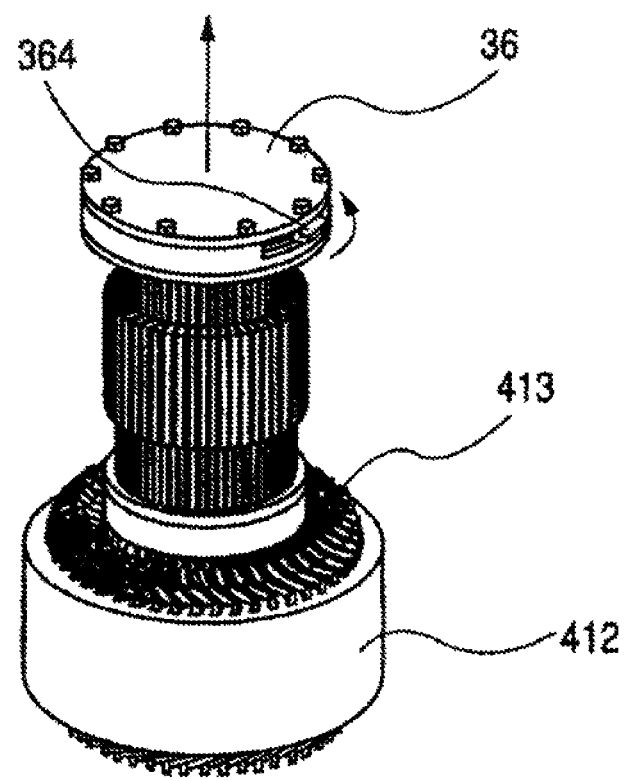
FIG. 27 is a perspective view of a coil insertion device proposed in Japanese Patent No. 5394058.

Although the coils 10 formed using the holding tools 30 according to an embodiment of this invention are manufactured and mounted onto for example the core 20 of the stator 100 shown in FIG. 1, it goes without saying that they can also be applied to the rotor of an electromechanical device. Moreover, so long as the core 20 or rotor has a plurality of teeth 21 to which the coils 10 are mounted and slots 22 between the teeth 21, the core 20 or rotor may be of either the split type as shown in FIG. 25, or the block type as shown in FIG. 26.

Each coil 10 has, as shown in FIGS. 2 and 3 (a), first and second storage sections 11a and 11b to be stored in the slots 22 described later, and first and second coil ends 12a and 12b that are continuous between the first and second storage sections 11a and 11b and to be arranged on the outside of the core 20, wherein the sections of the coil 10 constituting the first storage section 11a and the second storage section 11b are held by two holding tools 30 described later. In addition, as shown in FIG. 2 (b), between a first radial section formed by a winding-start section 10a and a second radial section formed by a winding-end section 10b of the windings 10A constituting the coil 10, the radii of the winding lap sections formed by the windings 10A change in a continuous manner.

The coil 10 is easily manufactured as shown in FIG. 2 (b), by winding one or more windings 10A around a bobbin 40 (FIG. 2 shows two windings 10A being wound simultaneously). Specifically, as shown in FIG. 2 (b), the coil 10 is formed by winding the windings 10A around a cylinder- or frame-shaped bobbin 40 such that between a first radial section formed by a winding-start section 10a and a second radial section formed by a winding-end section 10b of the windings 10A, the radii of the winding lap sections formed by the windings 10A change in a continuous or stepped manner.

Figure 8:
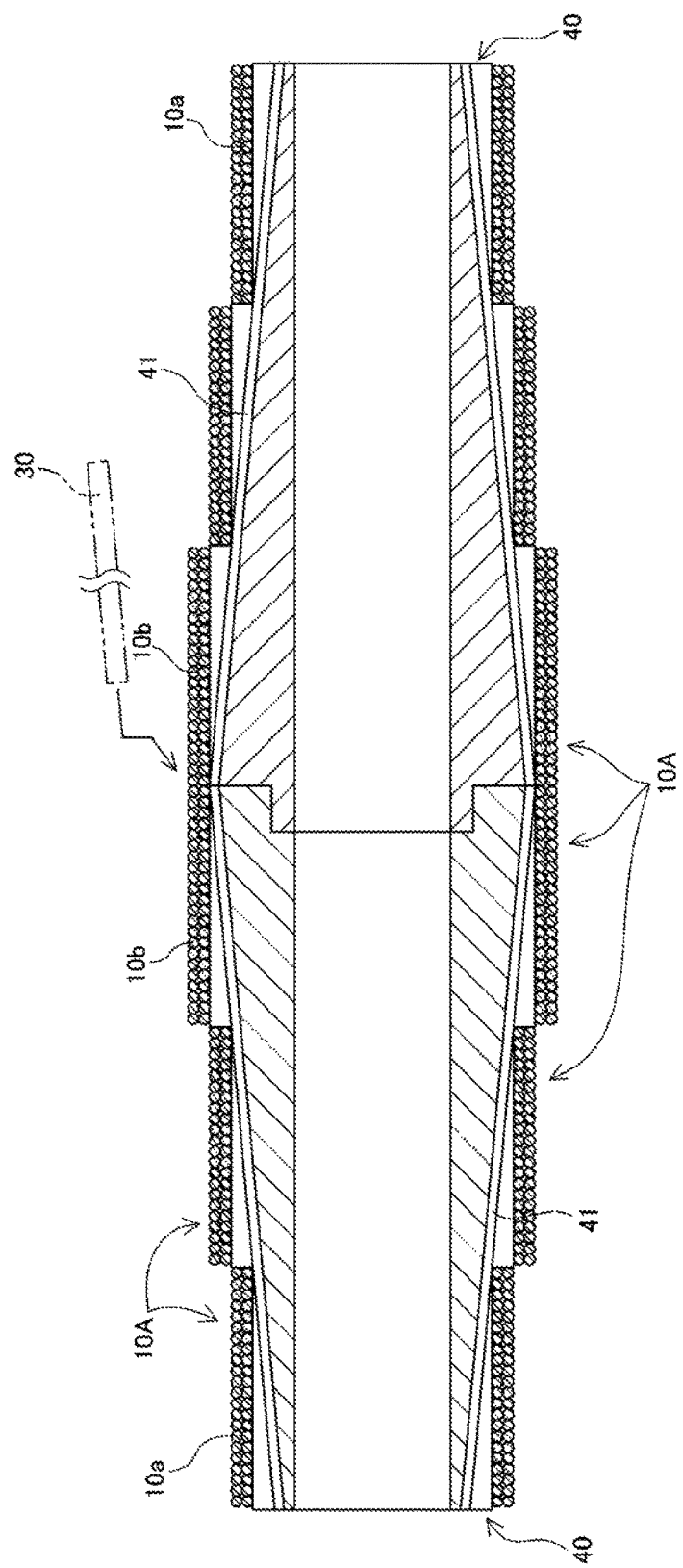
FIG. 8 is a cross-sectional view of a bobbin 40 used to form a coil 10 which has a radius that changes in a stepped manner.
Figure 10:
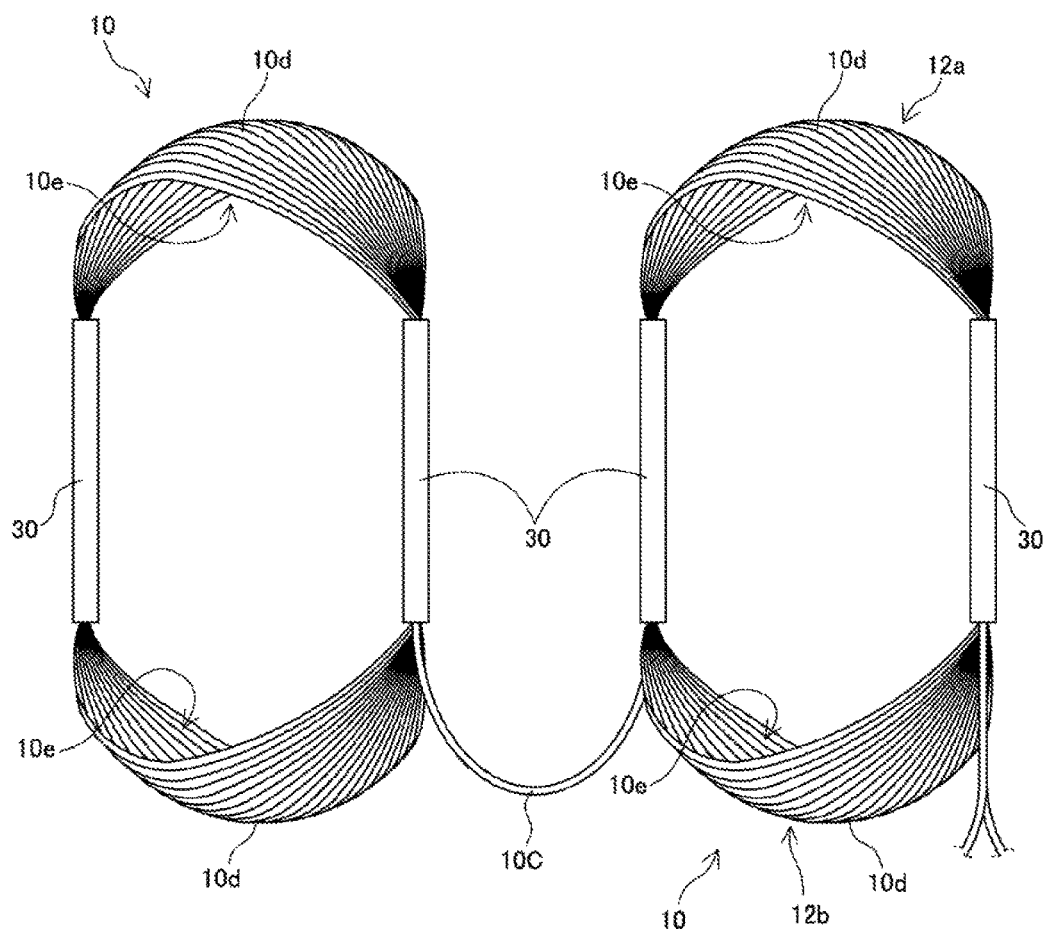
FIG. 10 is a side view of two coils 10 being held by the holding tools 30, where the coils 10 are electrically connected by a connecting wire 10C.
Figure 11:
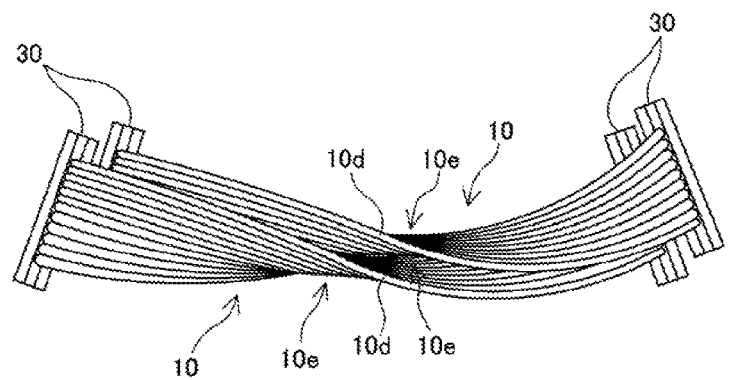
FIG. 11 is a plan view of lap winding a twisted section 10d and a next coil receiver 10e formed in each of the two coils 10 shown in FIG. 10.

As described above, the coils 10 are formed by being wound around a bobbin 40 as shown in FIG. 2 (b) or FIG. 8, and can thus be manufactured without the need for a complicated manufacturing method or device. Moreover, the windings 10A that constitute the coils 10 are not limited to rectangular wires as shown in FIGS. 25 (b) and 26 (b), but may also be commonly used round wires.

As shown in FIG. 2 (b), two insertion grooves 41 are formed in the axial direction of the bobbin 40 that causes the radii of the winding lap sections formed by the windings 10A to change in a continuous manner. Therefore, by inserting the holding tools 30 in these insertion grooves, the windings 10A wound around this bobbin 40 will be held with the sections constituting the first and second storage sections 11a and 11b being in parallel to each other.

Each holding tool 30 used in this embodiment is made of two rectangular plates that are coupled at one side so as to be able to open and close. After inserting one of the plates into the insertion groove 41, the second plate closes on the windings 10A so as to hold the windings 10A. Accordingly, an exit 31 is formed between these two plates as shown in FIGS. 3 (b) and 4 (b), and the held windings 10A can be ejected through this exit 31. Robotic hands may be used as these holding tools 30.

As these holding tools 30 are then moved relative to the bobbin 40 while holding the first and second storage sections 11a and 11b of the windings 10A, the coil 10 is removed and separated from the bobbin 40. In other words, by moving the holding tools 30 and the bobbin 40 relative to each other, the windings 10A constituting the first and second storage sections 11a and 11b of the coil 10 will be held in parallel to each other by the holding tools 30. The coil 10 is thus completed.

The manufacturing method according to this embodiment employs a plurality of bobbins 40 that are integrated in the axial direction, having the large diameter ends paired together and the small diameter ends paired together. In this case, the windings 10A can be cut off at locations other than between adjacent coils 10 so as to form a chain of two coils 10, or a chain of four coils 10 as shown in FIG. 26 (b), in which the coils 10 are electrically connected at the winding-start sections 10a and winding-end sections 10b.

The holding tools 30 hold two sections of the newly finished coil 10, as shown in FIG. 2 (a), so that the windings 10A constituting the coil 10 do not unravel. As previously described, the sections held by the holding tools 30 are referred to as the first storage section 11a and the second storage section 11b. The sections that protrude from the holding tools 30 are the first coil end 12a and the second coil end 12b, which are electrically continuous between the first and second storage sections 11a and 11b. As described below, in a case where a one slot-one coil type mounting method is employed, a twisted section 10d and accompanying next coil receiver 10e are formed in the first and second coil ends 12a and 12b. In a case where a one slot-two coils type mounting method is employed, a twisted section 10d is formed in the first and second coil ends 12a and 12b.

In either case, in the first coil end 12a and the second coil end 12b of the finished coil 10, the radii of the winding lap sections formed by the windings 10A change in a stepped manner between a first radial section (which is smaller) formed by the winding-start section 10a and a second radial section (which is larger) formed by the winding-end section 10b of the windings 10A, as shown in FIGS. 2 (a) and 3 (a).

Therefore, when the holding tools 30 are relatively rotated while holding the first and second storage sections 11a and 11b, a twisted section 10d is formed in the first and second coil ends 12a and 12b as exemplarily shown in FIG. 9. In this twisted section 10d, as the angle of rotation of the holding tools 30 increases, supposing that the winding-start section 10a has the smallest radius, the windings will be twisted into the twisted section 10d beginning with the winding-start section 10a, thereby forming a space around the twisted section 10d in which a twisted section 10d of another coil 10 can be arranged.

Then, when mounting the coil 10, the twisted section 10d of another coil 10 will fit seamlessly with the twisted section 10d of the first coil 10, such that the windings 10A will be arranged with the coil ends as short as possible, as shown in FIGS. 1 (a) and 22 (a). This not only reduces copper loss or iron loss in the coil ends, but, as shown in FIGS. 1 (b) and 22 (b), also allows for the height of the coil ends to be made significantly lower than in the example shown in FIG. 26 (a), thereby allowing for the total volume of an electromechanical device (e.g. a motor) to be made smaller.

Figure 23:
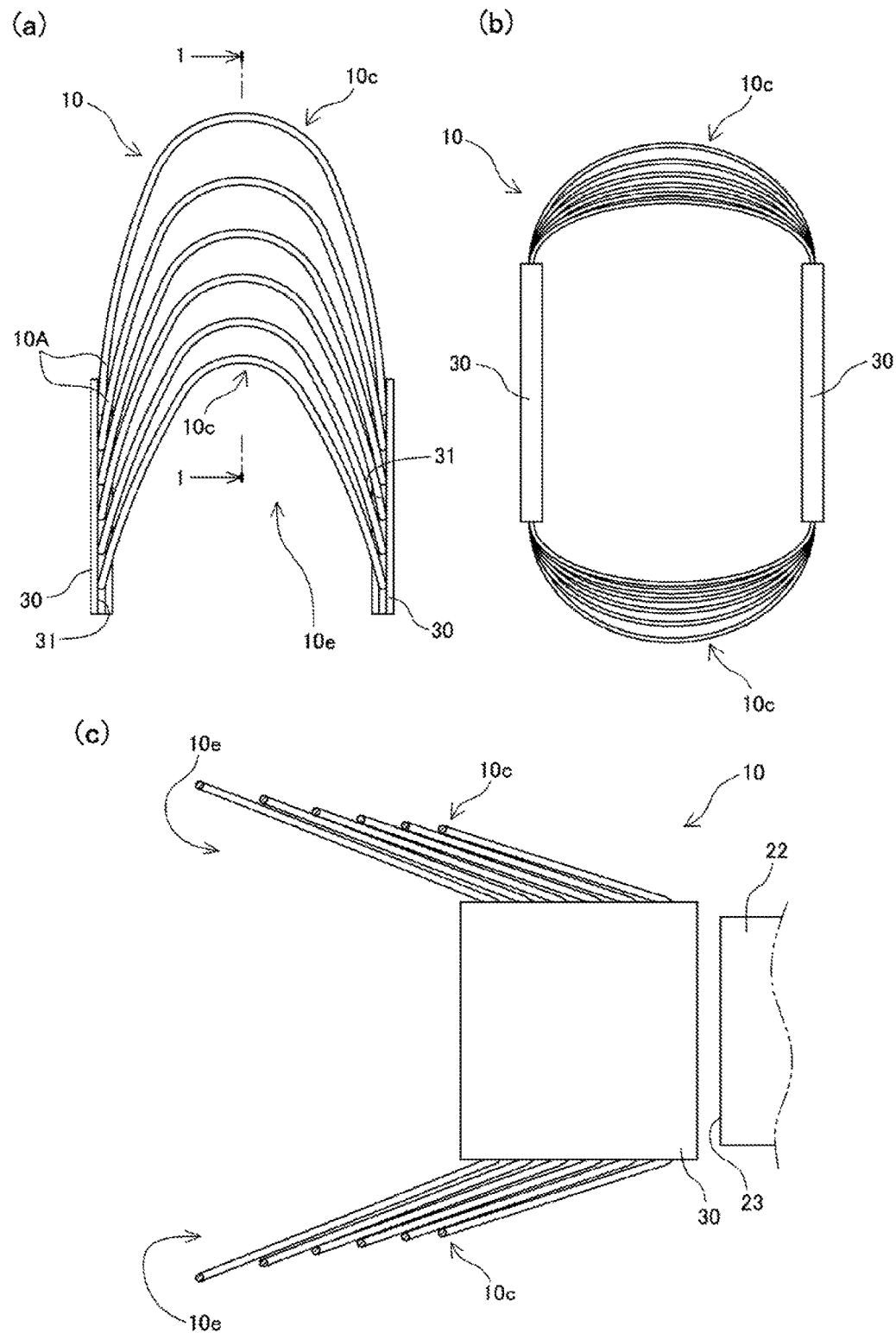
FIG. 23 shows a coil 10 for constructing the armature 100 according to the embodiment of the present invention, the coil 10 having curved sections 10c and next coil receivers 10e, where (a) is an enlarged plan view of two holding tools 30 arranged in parallel, (b) is a front view of same, and (c) is a cross-sectional view taken along line 1-1 in (a)

Meanwhile, by applying a force to the center of the first coil end 12a and the second coil end 12b while they are being held in parallel to each other by the holding tools 30, a curved section 10c as shown in FIG. 23 (a) will be formed. At this time, with the radii of the winding sections formed by the windings 10A changing in a continuous or stepped manner between the first radial section formed by the winding-start section 10a and the second radial section formed by the winding-end section 10b of the windings 10A, a next coil receiver 10e as shown in FIG. 23 (c) can also be formed on the lower side of the first and second coil ends 12a and 12b. When mounting the coil 10, the next coil receiver 10e of another coil 10 will be inserted into the next coil receiver 10e. This not only reduces copper loss or iron loss in the coil ends, but, as shown in FIGS. 1 (b) and 22 (b), also allows for the height of the coil ends to be made significantly lower than in the example shown in FIG. 26 (a).

The coils 10 made as described above are inserted into the slots 22 formed between the teeth 21 of the core 20. There are two exemplary types of insertion methods or mounting methods: A one slot-one coil type, and a one slot-two coils type. These methods will be described individually below.

(One Slot-One Coil Mounting Method)

Figure 24:
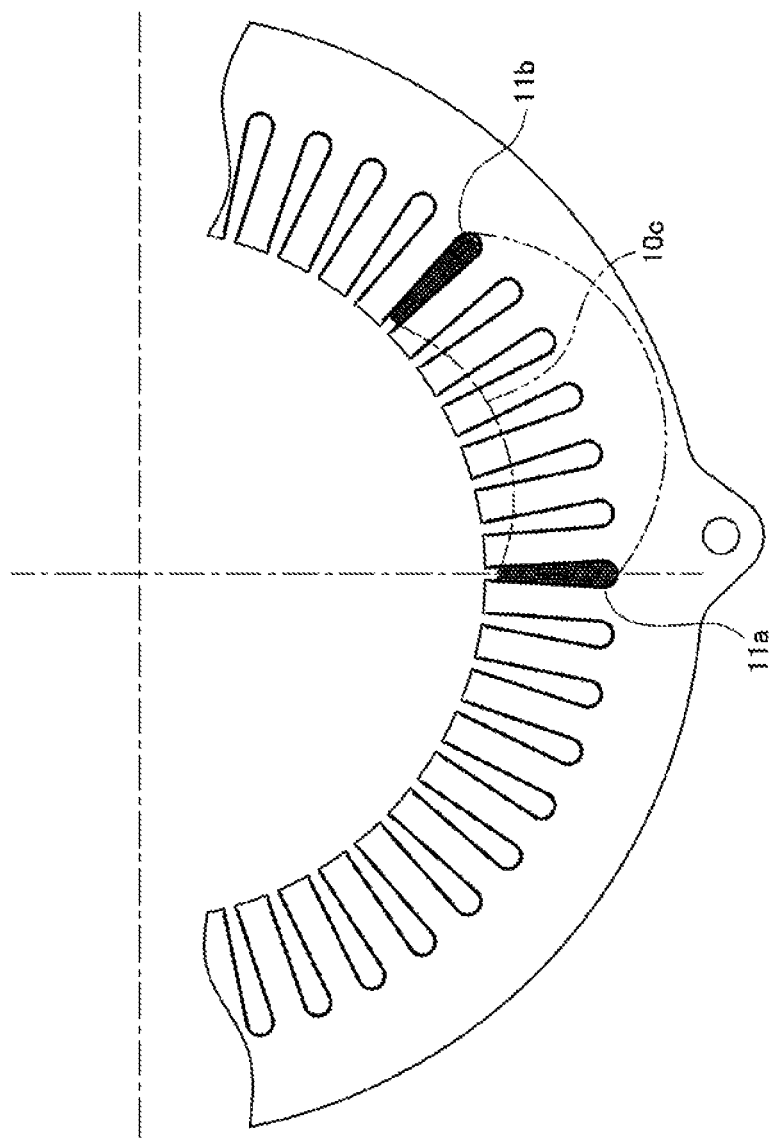
FIG. 24 is a partial plan view of the core 20 illustrating the positional relationship when one coil 10 is stored in one slot 22.

In this type of mounting method, one coil 10 is inserted into one slot 22 of the core 20 of an electromechanical device, as shown in FIG. 24, with the aim of making a stator 100 as shown in FIG. 22. First, as shown in FIG. 23, a curved section 10c (constituting a next coil receiver 10e) is formed in each of the first and second coil ends 12a and 12b located between two holding tools 30 holding one coil 10.

As a result, as shown in FIG. 23 (a) to (c), since the first radial section formed by the winding-start section 10a and the second radial section formed by the winding-end section 10b of the windings 10A change in a continuous or stepped manner with respect to the holding tools 30, a next coil receiver 10e in which the winding-end section 10b is the widest opening is naturally formed on the lower side of the curved section 10c between each of the first and second coil ends 12a and 12b and the holding tools 30, as shown in FIG. 23 (c).

Employing the coil 10 in which this next coil receiver 10e is formed, the exits 31 of the holding tools 30 holding the first coil 10 are aligned with the axial openings 23 of two respective slots 22 that are separate from each other by a specific distance. Next, the first and second storage sections 11a and 11b held by the respective holding tools 30 are pushed into the slots 22 through the exits 31.

The next coil 10, in which a next coil receiver 10e is formed through the aforementioned steps (a) to (c), is then inserted into the next slot 22 after the slot 22 in which the first coil 10 is mounted, such that the next coil receiver 10e of the next coil 10 is inserted in the next coil receiver 10e of the first coil 10. Since the second coil 10 in this case also has a next coil receiver 10e as shown in FIG. 23, this next coil receiver 10e will be stored without gaps within the next coil receiver 10e of the first coil 10.

When subsequent coils 10 are mounted in a similar manner onto a core 20, the next coil receivers 10e of for example the first coil ends 12a protrude inwardly, where the rotor of the core 20 is to be arranged, and the next coil receivers 10e are therefore bent toward the opposite side, as shown in FIGS. 23 (c) and 24. In a case where the coils 10 are mounted onto a rotor, the next coil receivers 10e of the first and second coil ends 12a and 12b do not need to be bent, as they protrude toward the center.

(One Slot-Two Coils Mounting Method)

This type of mounting method differs from the one slot-one coil type method described above. As shown in FIG. 20, the first storage section 11a of a first coil 10 and the second storage section 11b of a second coil 10 are inserted or mounted in each of a plurality of slots 22 of a rotor 20, with the aim of making a stator 100 as shown in FIG. 1. In this mounting method, as shown in FIG. 20 (a), the first and second storage sections 11a and 11b of the first coils 10 are respectively stored in a first slot 22, and another slot 22 separate from the first slot 22 by a specific distance. At this time, the windings 10A constituting the first and second storage sections 11a and 11b are in an unraveled state within the slots 22, leaving space for the insertion of the first and second storage sections 11a and 11b of subsequent coils 10.

In this mounting method, the exit 31 of the holding tool 30 holding the first storage section 11a of the coil 10 is aligned with the axial opening 23 of one slot 22, and the first storage section 11a is inserted into the slot 22. In a case where the second storage section 11b of another coil 10 has not yet been inserted into the slot 22, the windings 10A constituting the first storage section 11a will be stored in an unraveled state in the slot 22, so that when the second storage section 11b of a subsequent coil 10 is forcefully inserted into the slot 22, the first storage section 11a of the first coil 10 and the second storage section 11b of the subsequent coil 10 will be packed tightly together. Insertion is carried out by means of an ejecting plate that pushes out the windings 10A from the holding tool 30, but it can also be carried out automatically by the elastic force inherent in the windings 10A.

Next, by twisting the holding tool 30 holding the second storage section 11b of the coil 10 relative to the holding tool 30 holding the first storage section 11a, a twisted section 10d as exemplarily shown in FIG. 9 is formed in the first coil end 12a and in the second coil end 12b. This twisted section 10d is formed by such relative rotation of two holding tools 30 in the state shown in FIG. 2 (a) by 180 degrees (to the state shown in FIG. 9 (b)).

When this twisted section 10d is formed, between a first radial section formed by a winding-start section 10a and a second radial section formed by a winding-end section 10b of the windings 10A, the radii of the winding lap sections formed by the windings 10A change in a stepped manner. Therefore, in the twisted section 10d, the winding sections will be twisted, in upward order, from the winding section with the smallest radius to the winding section with the largest radius, and around the first coil end 12a and second coil end 12b of the first coil 10 will be formed a space, in other words a next coil receiver 10e, in which a twisted section 10d of a second coil 10 can be arranged in a closely adhered state, as shown in FIGS. 9 (b) and 20 (b).

Next, the exit 31 of the holding tool 30 holding the second storage section 11b of the coil 10 is aligned with the axial opening 23 of another slot 22 separate from the aforementioned slot 22, and the second storage section 11b is pushed into this slot 22 by the ejecting plate of the holding tool 30.

The next coil 10 is then inserted into the other slot 22 separate from the slot 22 in which the previous coil 10 is mounted, while the twisted section 10d and next coil receiver 10e formed through the aforementioned process are overlapped with the twisted section 10d and next coil receiver 10e of the previous coil 10. This process is then repeated.

At this time, the center of the twisted section 10d of the previous coil 10 is more constricted due to the twisting than the peripheral sections, such that the peripheral sections of the twisted section 10d are in an expanded state. Therefore, in the vicinity of the twisted section 10d of the coil 10 there will be formed a space, in other words a next coil receiver 10e. The twisted section 10d of the next coil 10, which is to be inserted into a next slot 22 separate from the first slot 22 by the pitch between the slots 22, is to be stored in this next coil receiver 10e in a closely adhered state. In other words, the twisted section 10d of the next coil 10 is arranged so as to be entwined with the twisted section 10d of the previous coil 10, and when insertion of the previous coil 10 and the adjacent next coil 10 is finished, the twisted sections 10d and next coil receivers 10e are in a closely adhered state.

In the final step of the insertion process where two distributedly wound coils 10 are inserted into a plurality of slots 22 in the "one slot-two coils" configuration, there will naturally be cases where the previously inserted coils 10 become obstructions. By final step is meant a step in which, when the first storage sections 11a of the first to seventh coils 10 are inserted in order into the first to seventh slots 22, respectively, the second storage sections 11b of the final $n^{th}$ to n-6$^{th}$ coils 10 are inserted into the final $n^{th}$ to n-6$^{th}$ slots 22.

Thus, in the final step of the insertion process, with respect to a slot 22 into which the second storage section 11b is to be inserted but a first storage section 11a of the previous coil 10 has already been inserted, the first storage section 11a is temporarily taken out and the second storage section 11b of the next coil 10 is inserted and pushed into the outer side of the slot 22, while the first storage section 11a is reinserted so as to be at the inner side.

Figure 12:
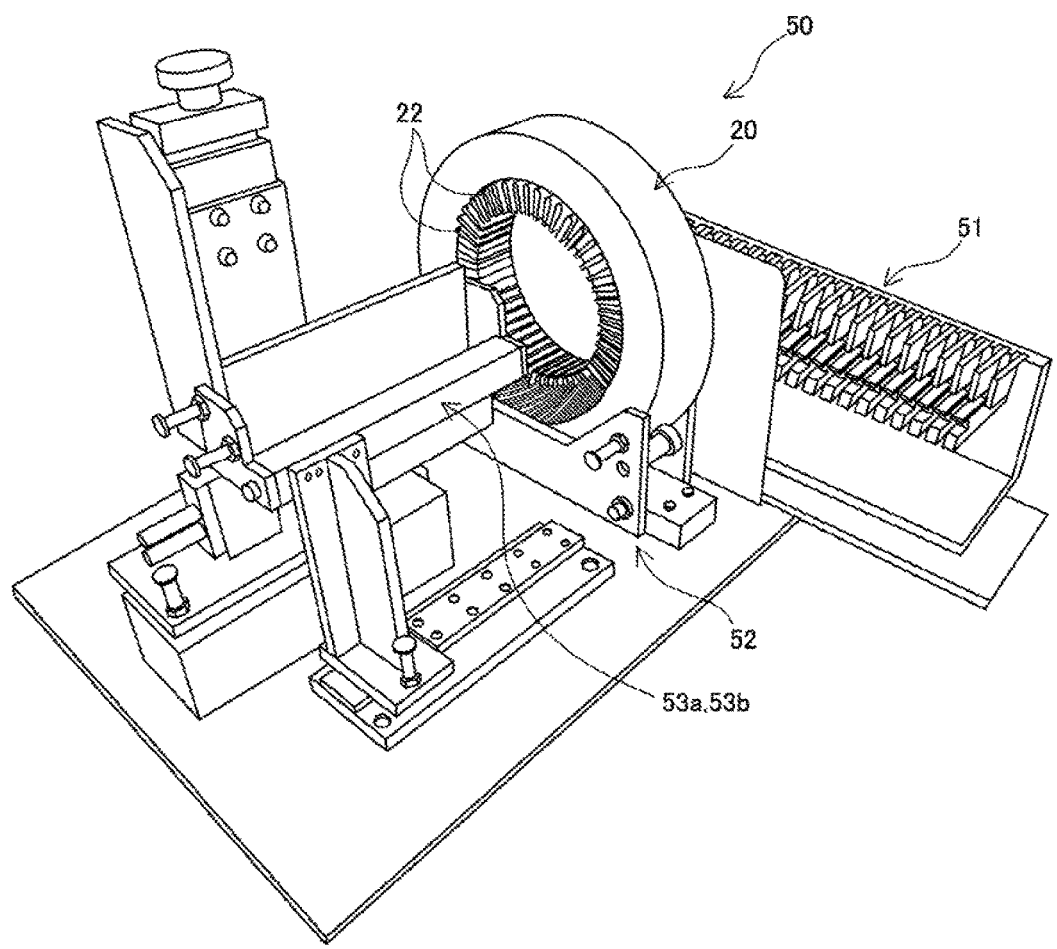
FIG. 12 is a general perspective view of a coil mounting device 50 for mounting the coils 10 in the slots 22.

A coil mounting device 50 as shown in FIG. 12 is used for the insertion of the coils 10 into the slots 22. This coil mounting device 50 includes a coil shelf 51 that can accommodate a plurality of coils 10 held in holding tools 30 and a core rotator 52 that sequentially rotates and positions the core 20, and is configured to transport the coils 10 held in the holding tools 30 from the coil shelf 51 to the core 20 supported by the core rotator 52. The coils 10 are stored in the coil shelf 51 in a manner shown in FIG. 3.

The coil mounting device 50 additionally includes a first assist arm 53a and a second assist arm 53b, which are individually rotated and moved into and out of the core 20 on the core rotator 52, and are configured to operate depending on the state of the coils 10 so as to twist for example the second storage section 11b of each coil 10 to form the twisted section 10d.

Insertion of the coils 10 into the core 20 using the coil mounting device 50 will be described below with reference to FIGS. 13 to 21.

This embodiment shows an example of a one slot-two coil insertion process in which a first storage section 11a of one coil 10 and a second storage section 11b of another coil 10 are stored in each of 48 slots 22 of a core 20. As exemplarily shown in FIG. 13 (a), the first storage section 11a of the first coil 10 is stored in the first slot 22, and the second storage section 11b of the coil 10 is stored in the 43$^{rd}$ slot 22 in the clockwise direction. In other words, a process of distributed winding is carried out, in which the first and second storage sections 11a and 11b of one coil 10 are stored in two slots 22 across five other slots 22.

First, a required number of coils 10 are stored on the coil shelf 51 of the coil mounting device 50 shown in FIG. 12. The coils 10 are in the state shown in FIG. 13 (b), in which one of the holding tools 30 is rotated relative to the other one such that the first and second storage sections 11a and 11b are aligned in a straight line. The required number of coils 10 is set in the coil shelf 51 by storing two holding tools 30 holding one coil 10 in this state in each gap of the coil shelf 51.

Figure 13:
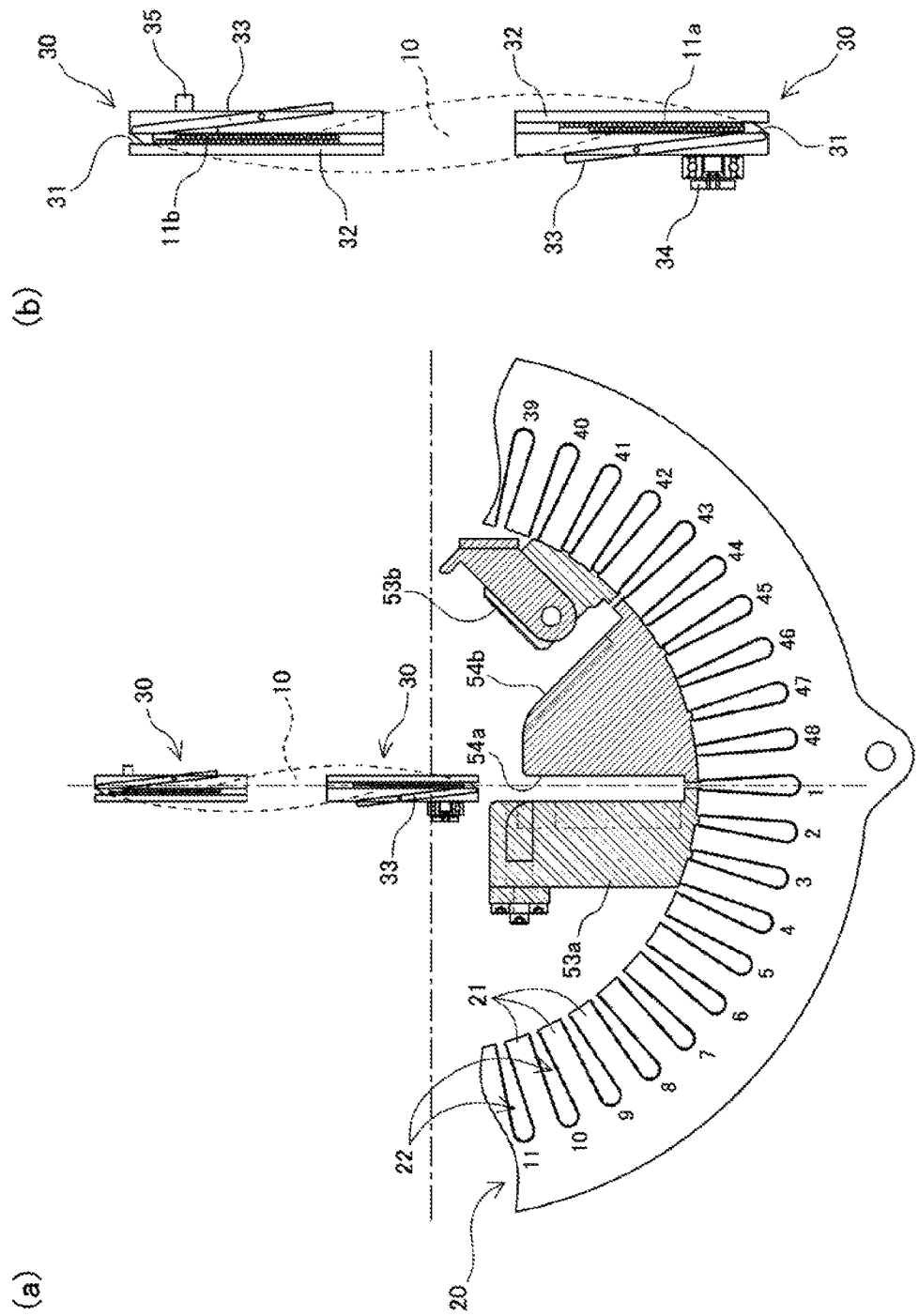
FIG. 13 shows a first of seven steps of a process in which one coil 10 is inserted in two slots 22 by the coil mounting device 50, where (a) is a partial plan view of the core 20, and (b) is an enlarge plan view of the coil 10 and the holding tools 30 at that time.

Next, as shown for example in FIG. 13 (a), the coil mounting device 50 is operated with respect to the core 20 having first to 48$^{th}$ slots 22 so that the holding tool 30 holding the first storage section 11a of the first coil 10 faces the first slot 22. At this time, as shown in FIG. 13 (a), the tip of the first assist arm 53a is moved into the core 20 such that a first guide channel 54a formed at the tip of the first assist arm 53a faces the first slot 22, and the second storage section 11b of the coil 10 is on standby outside of the guide channel 54a (at the upper side of FIG. 13).

In the state shown in FIG. 13, the two holding tools 30 that were stored horizontally in the coil shelf 51 are rotated 90 degrees to a vertical position. In other words, the two holding tools 30 aligned in a vertical line are orthogonal to the axial opening 23 of the slot 22. In the state shown in FIG. 13, particularly in FIG. 13 (a), the tip of the second assist arm 53b having a second guide channel 54b is arranged to the right of the first assist arm 53a such that the second guide channel 54b faces the 43$^{rd}$ slot 22 and is standing by to store the second storage section 11b of the first coil 10.

Looking more closely at the state of the first coil 10, as shown in FIG. 13 (b), the first storage section 11a is sandwiched between a base plate 32 and a swinging plate 33 at the lower side of the drawing. The lower end of the first storage section 11a is held by the tip of the closed swinging plate 33 such that the first storage section 11a cannot leave through the exit 31. Meanwhile, the holding tool 30 holding the second storage section 11b of the coil 10 on the upper side of the drawing has its exit 31 at the top end, which exit 31 is also closed by a closed swinging plate 33. The portions other than the first and second storage sections 11a and 11b held by the holding tools 30 are the first and second coil ends 12a and 12b, in which a twisted section 10d has already been formed by relative rotation of the holding tools 30.

Figure 14:
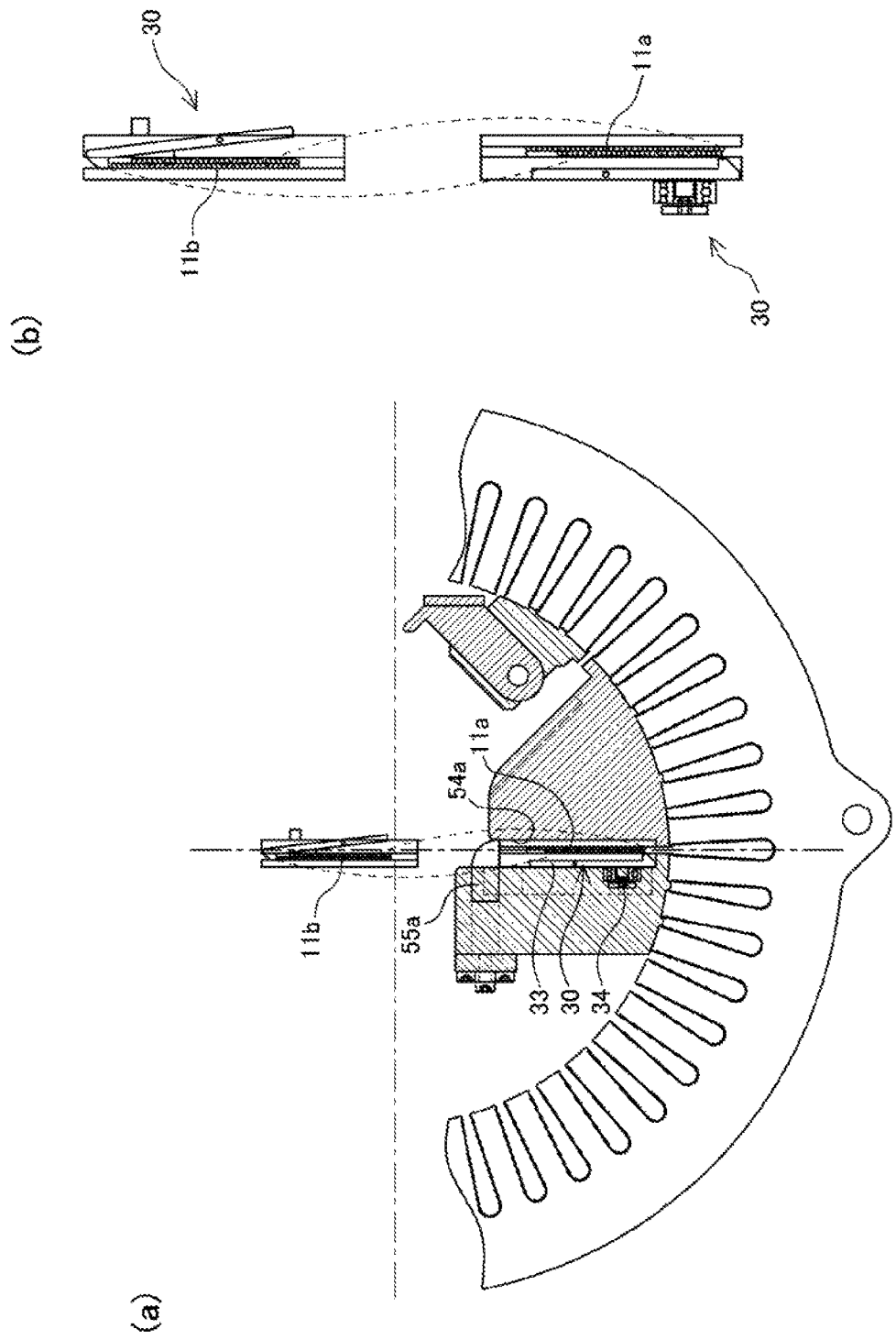
FIG. 14 shows a second step, where (a) is a partial plan view of the core 20, and (b) is an enlarged plan view of the coil 10 and the holding tools 30 at that time.

Next, the coil mounting device 50 is operated so that, as shown in FIG. 14 (a), the holding tool 30 holding the first storage section 11a is inserted into the first guide channel 54a of the first assist arm 53a. Since this first guide channel 54a is a long, straight groove, the swinging plate 33 is pushed against the biasing force of the first engaging pin 34 so that the swinging plate 33 becomes parallel to the base plate 32, which opens the exit 31 of the lower holding tool 30 as shown in FIG. 14 (b).

Once the entire lower holding tool 30 is stored in the first guide channel 54a, a first stopper 55a provided at the first assist arm 53a closes the upper portion of the first guide channel 54a, so that the first storage section 11a of the coil 10 will not accidentally pop out of the first guide channel 54a. At this time, the upper holding tool 30 holding the second storage section 11b will be brought closer to the end of the first assist arm 53a.

Figure 15:
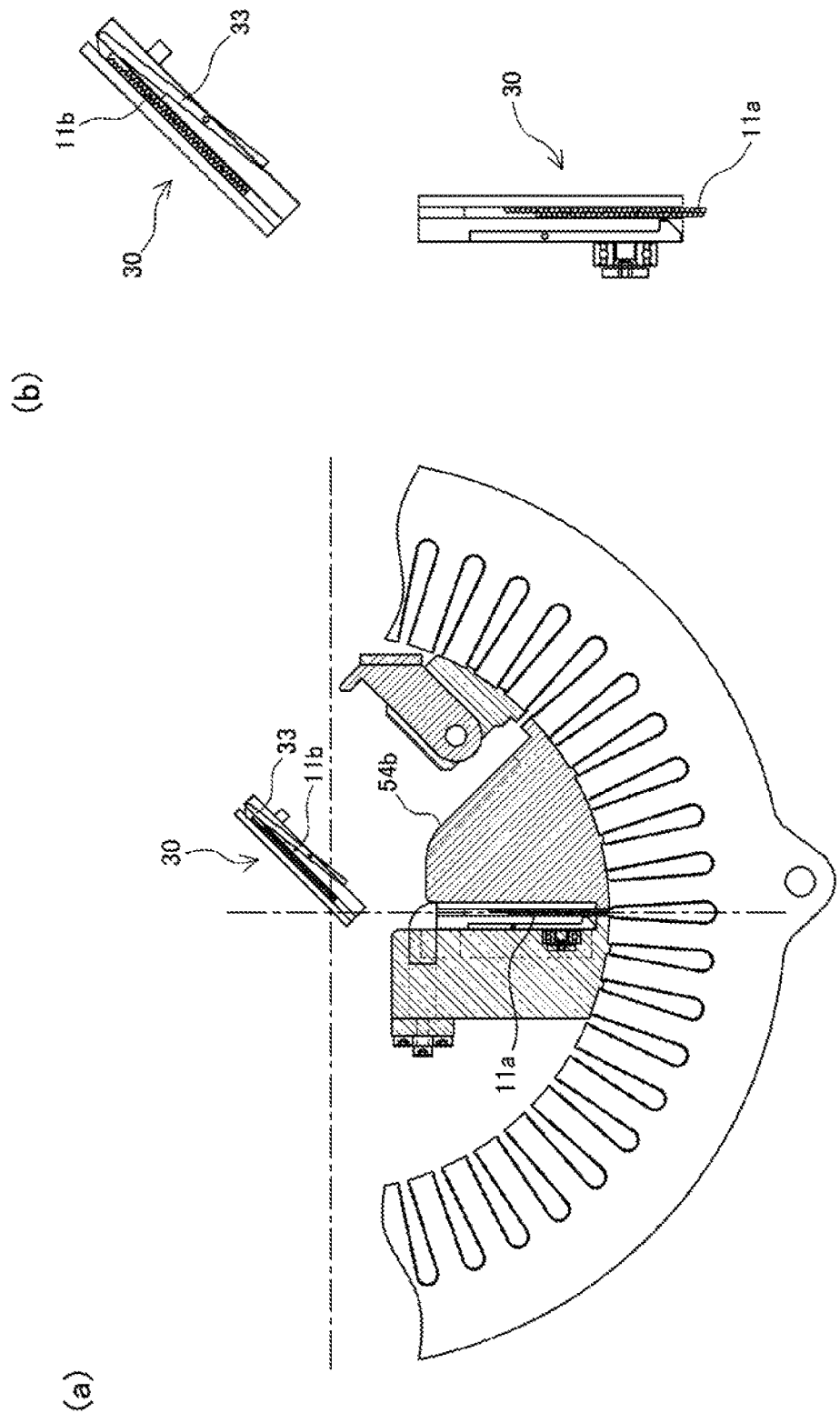
FIG. 15 shows a third step, where (a) is a partial plan view of the core 20, and (b) is an enlarged plan view of the coil 10 and the holding tools 30 at that time.
Figure 16:
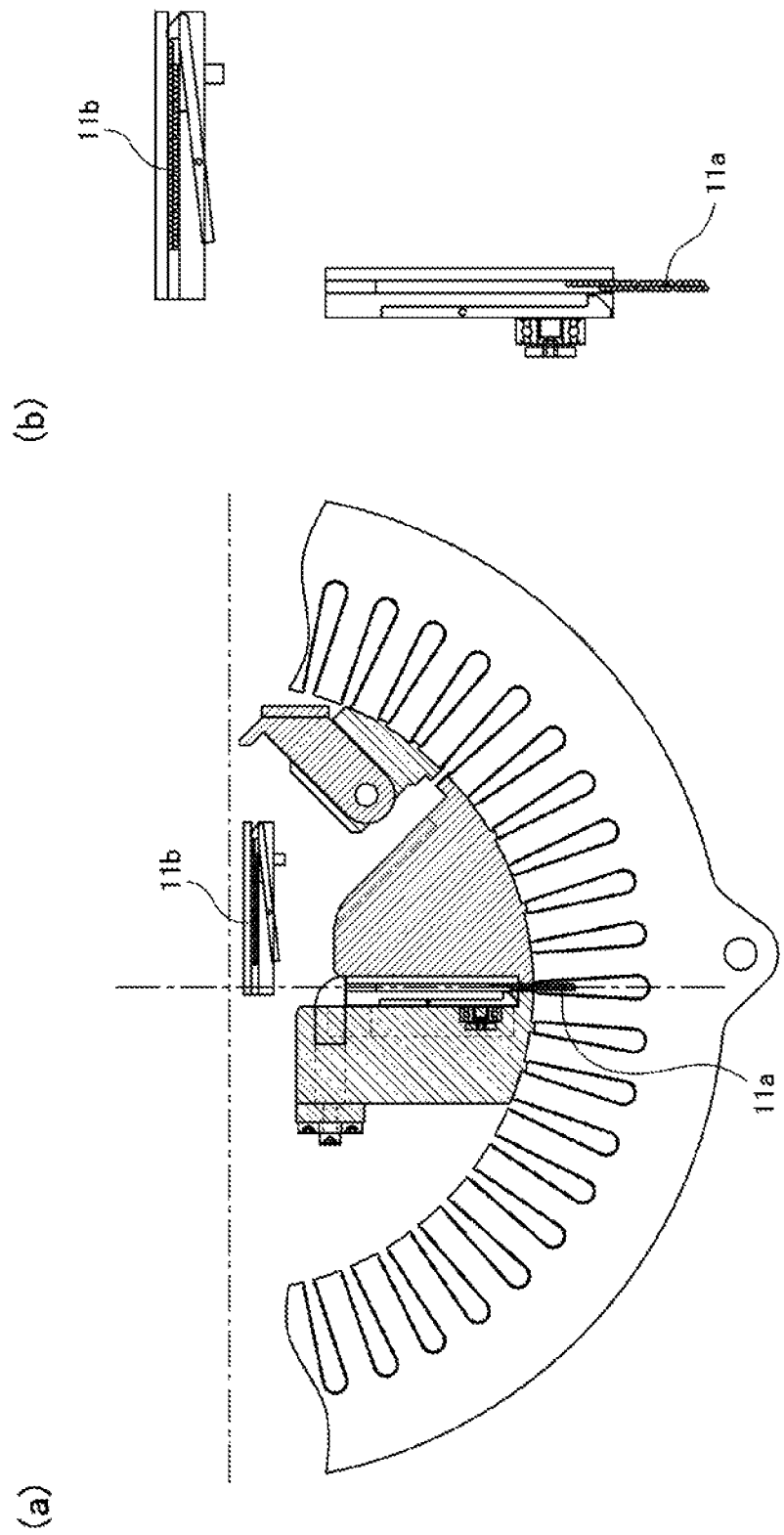
FIG. 16 shows a fourth step, where (a) is a partial plan view of the core 20, and (b) is an enlarged plan view of the coil 10 and the holding tools 30 at that time.
Figure 17:
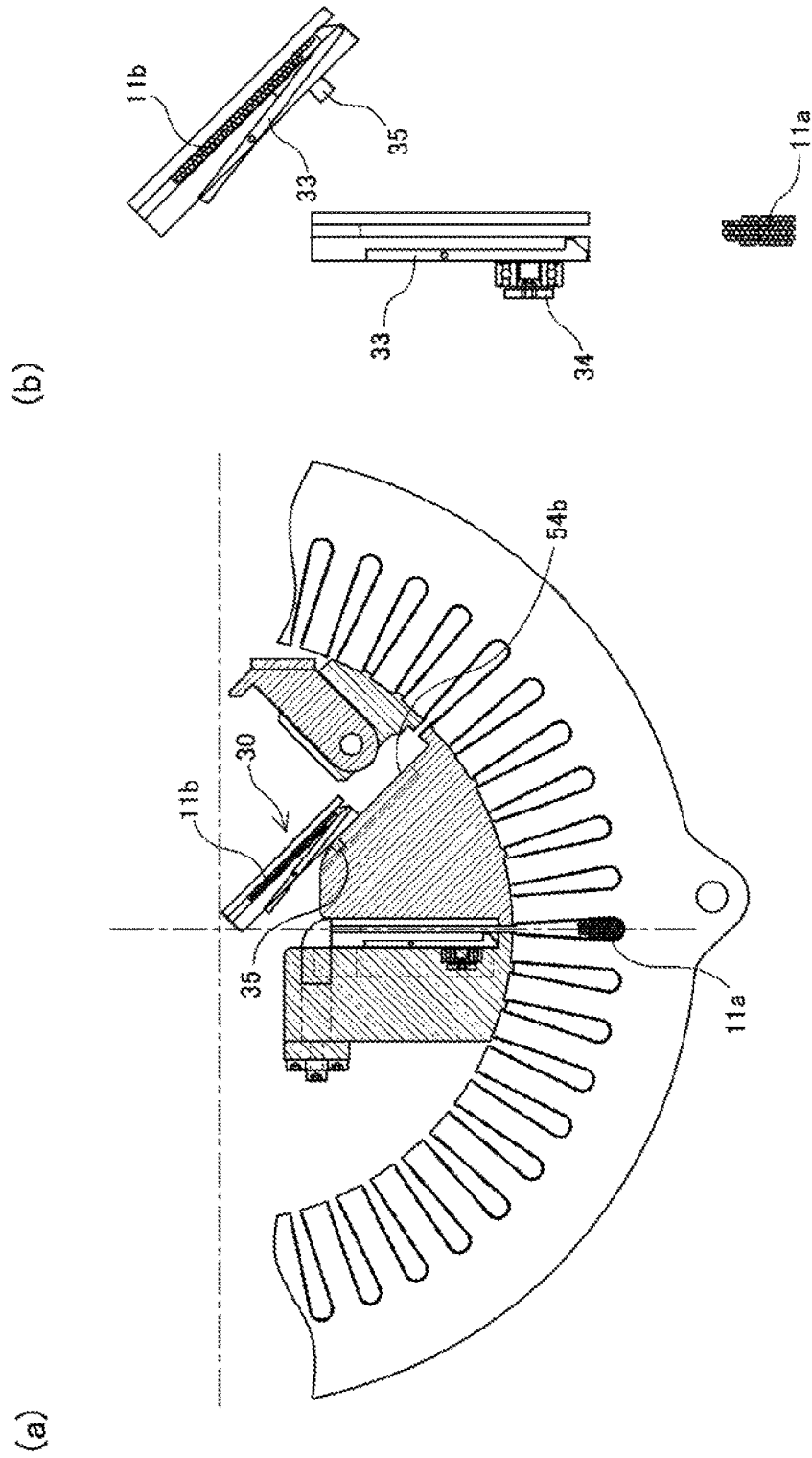
FIG. 17 shows a fifth step, where (a) is a partial plan view of the core 20, and (b) is an enlarged plan view of the coil 10 and the holding tools 30 at that time.
Figure 18:
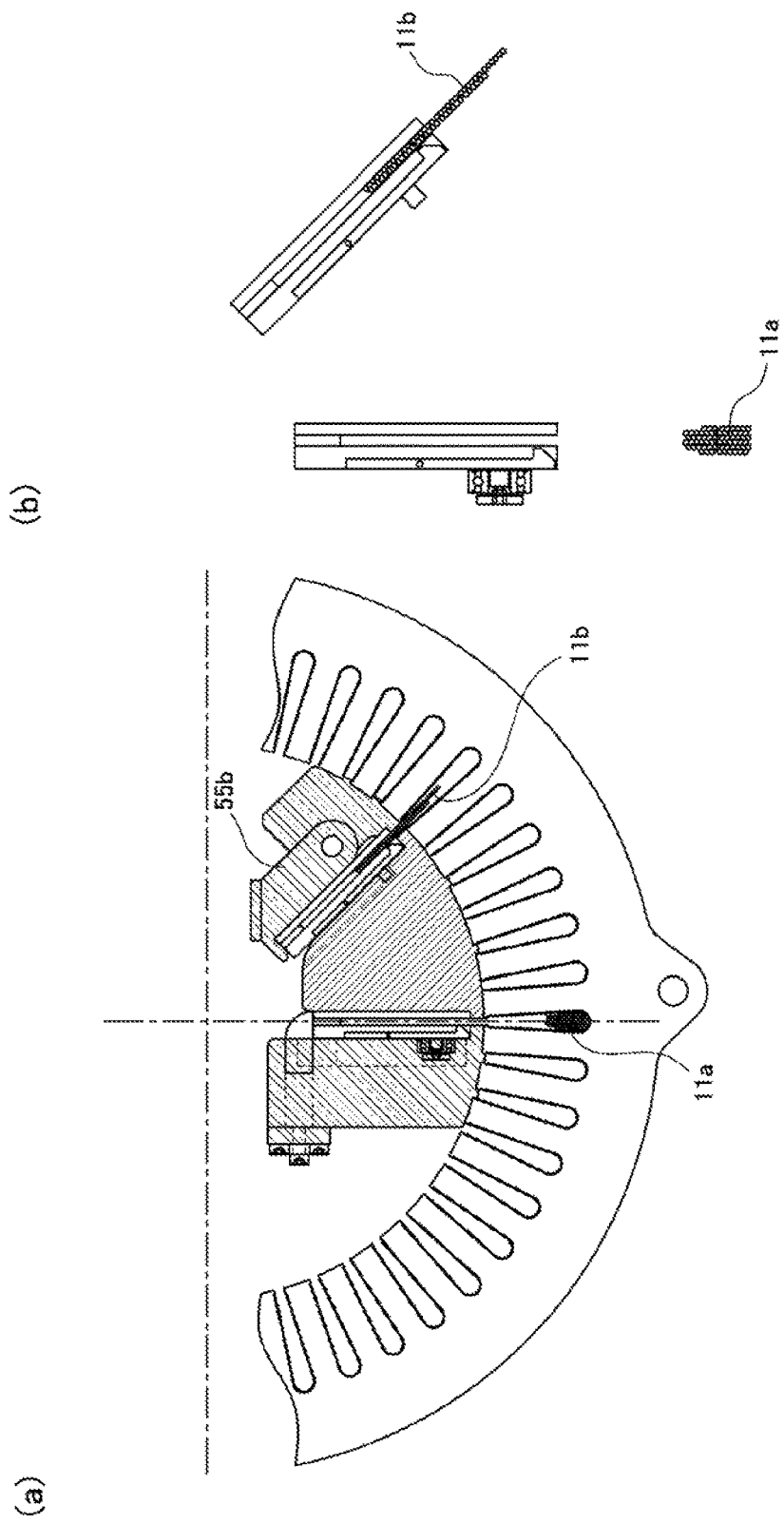
FIG. 18 shows a sixth step, where (a) is a partial plan view of the core 20, and (b) is an enlarged plan view of the coil 10 and the holding tools 30 at that time.

Now, as the upper holding tool 30 is rotated in a clockwise direction, the first storage section 11a that was held inside the lower holding tool 30 begins to enter the first slot 22 and the exit 31 of the upper holding tool 30 is rotated to face the second guide channel 54b, as shown in FIGS. 15 to 17. The first storage section 11a of the coil 10 begins to enter the first slot 22 due to the force from the second storage section 11b connected via the first and second coil ends 12a and 12b as the upper holding tool 30 is rotated in the clockwise direction. Of course, the first storage section 11a may be pushed into the slot 22 by other means.

As shown in FIG. 17, when the holding tool 30 holding the second storage section 11b is brought to the opening of the second guide channel 54b by the coil mounting device 50, it is pushed further into the second guide channel 54b while being guided by the second engaging pin 35. At this time, the first storage section 11a is almost entirely in the outer side of the respective slot 22. When the second storage section 11b is pushed into the slot 22 as shown in FIG. 14, the closed state of the swinging plate 33 of the holding tool 30 is released, opening the exit 31 so that the second storage section 11b enters the 43$^{rd}$ slot 22. A second stopper 55b then closes the opening of the second guide channel 54b.

Figure 19:
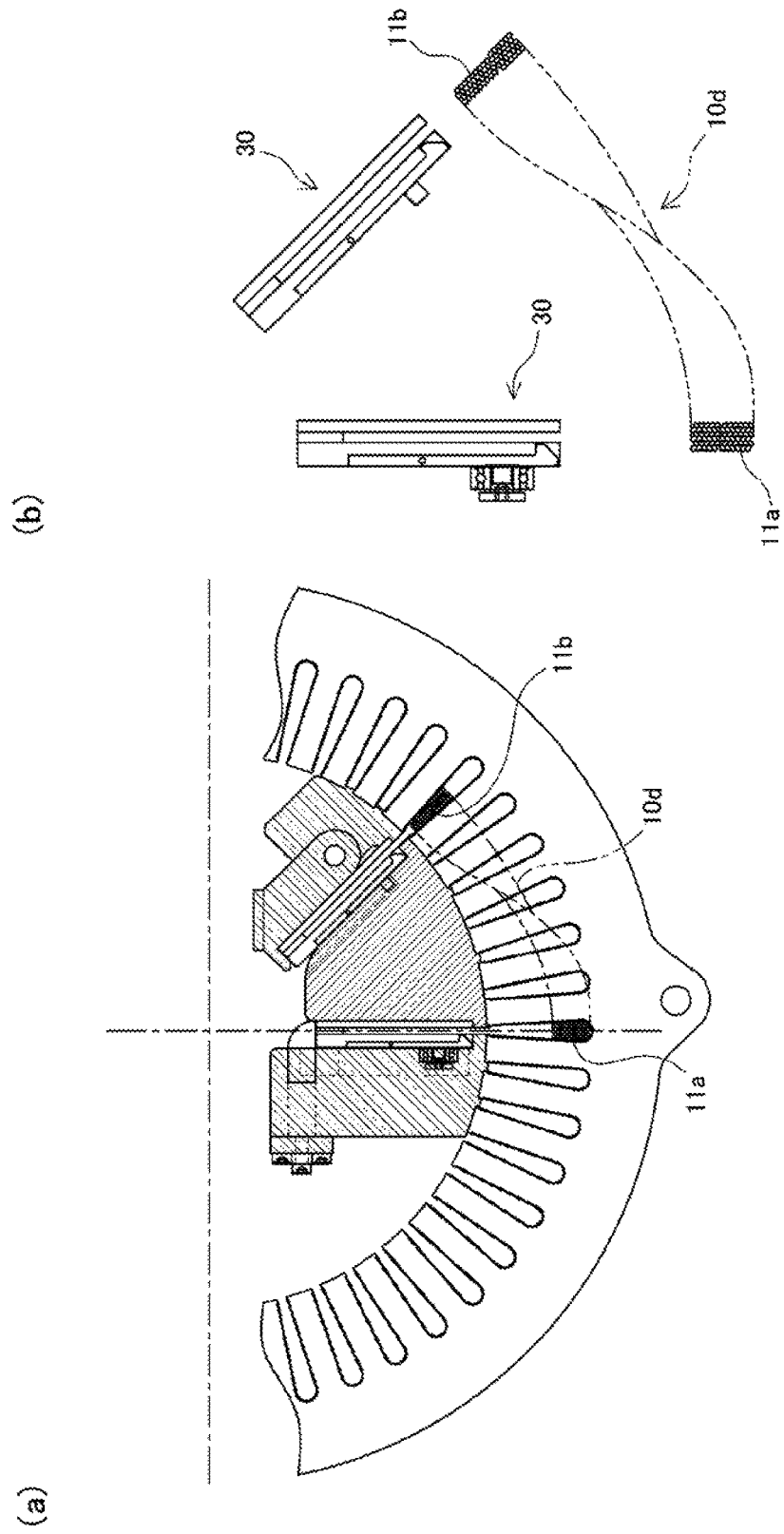
FIG. 19 shows a seventh and final step, where (a) is a partial plan view of the core 20, and (b) is an enlarged plan view of the coil 10 and the holding tools 30 at that time.

When insertion of the second storage section 11b is carried out to its final step, the second storage section 11b completely enters the slot 22, and the twisted section 10d between the first and second storage sections 11a and 11b will span across five slots 22, as shown in FIG. 19 (a). By repeating the process described above as shown in FIGS. 20 (a) and (b), the first storage section 11a of the first coil 10 will be stored at the outer side of the first slot 22, while the second storage section 11b of the sixth coil 10 will be stored at the inner side of the first slot 22, as shown in FIG. 21.

Figure 21:
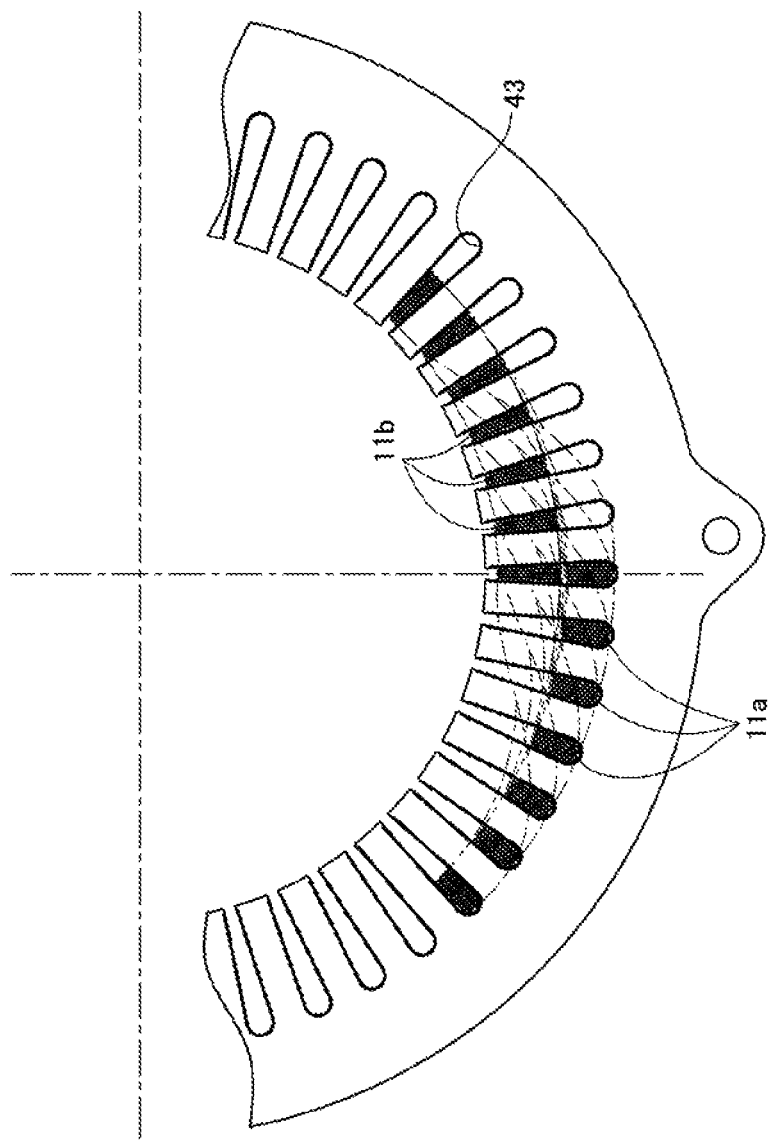
FIG. 21 is a partial plan view of the core 20 showing how seven coils 10 are similarly stored in order in the slots 22.

By repeating this process, most of the first and second storage sections 11a and 11b of the coils 10 will be stored in the slots 22, but as shown in FIG. 21, the second storage sections 11b already stored in the inner sides of the 43$^{rd}$ slot 22 to the 48$^{th}$ slot 22 obstruct the first storage sections 11a that are supposed to be stored at the outer sides of these slots 22. These second storage sections 11b are therefore temporarily removed from the slots 22 so that the first storage sections 11a can be inserted, and are then reinserted into the slots 22.

Although this final operation forms a boundary line 10B between the plurality of coils 10 as shown in FIG. 1 (a), this boundary line 10B is caused by the different manners of entwinement between the coils 10, and is completely unrelated to the aforementioned issues of copper loss or protruding coil ends, and is not a cause of these issues.

The example shown in FIGS. 22 to 24 is a case where one coil is stored in one slot. In this case, unlike in the aforementioned one-slot-two coils method, there are no second storage sections 11b already stored in the inner sides of the 43$^{rd}$ slot 22 to the 48$^{th}$ slot 22 that obstruct the first storage sections 11a that are supposed to be stored at the outer sides of these slots 22. Therefore, as shown in FIG. 22, no boundary line 10B will be formed between the coils 10.

The armature 100, the coils 10 constituting the armature 100, and the method for mounting these coils 10 in the slots 22 of the core 20 can be expressed in terms of the following technical means 1 to 5. First, technical means 1 is as follows: "A coil 10 for an electromechanical device, the coil 10 to be mounted in slots 22 between a plurality of teeth 21 of a core 20 for the electromechanical device that converts electrical energy and mechanical energy, wherein one or more windings 10A are wound to form the first and second storage sections 11a and 11b that are to be stored in the slots 22, and the first and second coil ends 12a and 12b that are continuous between the first and second storage sections 11a and 11b and are arranged on the outside of the core 20, and wherein the windings 10A constituting the first storage section 11a and the second storage section 11b are held by two holding tools 30 in a state maintaining the alignment of the windings 10A, wherein when these two holding tools 30 are rotated relative to each other, in a state where the alignment of the windings 10A constituting the first storage section 11a and the second storage section 11b is maintained, the twisted section 10d can be formed in the first and second coil ends 12a and 12b, and the coil 10 can be mounted in the slots 22 between the teeth 21."

As shown in FIG. 2 to 5 or 20, the coil 10 according to the technical means 1 consists of one or more windings 10A that are wound by distributed winding, and is held at two sections by two holding tools 30. From the completion of the coil 10 and until it has been stored in a specific slot 22, these holding tools 30 maintain the alignment of the distributedly wound windings 10A, in other words prevent them from unravelling, allowing for deformation of the first and second coil ends 12a and 12b of the coil 10 until it has been stored, without altering the shape of the first and second storage sections 11a and 11b.

The coil 10 is wound by distributed winding such as proposed in Japanese Unexamined Patent Application Publication No. 2009-195005, in which coils are wound across a plurality of slots and coils which are in phase or out of phase with each other are overlapped at the coil ends, and has first and second storage sections 11a and 11b that are stored in two respective slots 22. As shown in FIG. 9 (a), between these first and second storage sections 11a and 11b, the first and second coil ends 12a and 12b are respectively exposed at the upper and lower sides of the drawing. Further, as shown in FIGS. 2 (a) and 6, both ends of the windings 10A are left protruding from the coil 10 as connecting lines 10C for electrically connecting the coil 10 to another coil 10 or to a power supply.

The coil 10 according to the technical means 1 is manufactured according to the manufacturing method described later, which has a basic configuration in which one or more windings 10A are wound around a cylinder or frame to form the first and second storage sections 11a and 11b that are to be stored in the slots 22 defined by the teeth 21, and the first and second coil ends 12a and 12b that are continuous between the first and second storage sections 11a and 11b and are arranged on the outside of the core 20, and wherein the first storage section 11a and the second storage section 11b of the coil 10 are held by two holding tools 30 in a state maintaining the alignment of the windings 10A. Accordingly, these coils 10 enable the following:

(A) Both round wires and rectangular wires may be used as the conducting wires that constitute the coils, with no limitations on the shape of the cross-section of the wires.

It is important that the sections of the coil 10 that constitute the first and second storage sections 11a and 11b are held by the holding tools 30 such that the alignment of the windings 10A is maintained. This is because when a plurality of coils 10 are mounted onto the teeth 21, in a case where a curved section 10c is formed in the first and second coil ends 12a and 12b (i.e. when one coil is stored in one slot), or in a case where a twisted section 10d is formed in the first and second coil ends 12a and 12b and the twisted sections 10d of each coil 10 are overlapped with each another (i.e. when two coils are stored in one slot), the first and second coil ends 12 a and 12b of the first coil need to be naturally deformed such that the first and second coil ends 12a and 12b of the next coil 10 can overlap without gaps. Accordingly, these coils 10 made using the holding tools 30 enable the following: (D) The space factor of the coils in the slots can be made high.

(When One Coil is Stored in One Slot)

In this case, the first and second storage sections 11a and 11b of the first distributedly wound coil 10 are respectively stored in a first slot 22 and in another slot 22 separate from the first slot 22 by a certain distance, as shown in FIG. 24. A portion of for example the first coil end 12a will protrude towards the center where the rotor of the stator core 20 is to be stored, as shown in FIGS. 23 (c) and 22. At this time, however, a curved section 10c is naturally formed at the lower side of the first coil end 12a, as shown in FIG. 23 (c).

A second coil 10 is mounted adjacent to the first coil 10, and since a curved section 10c as shown in FIG. 23 is also formed in this second coil 10, this curved section 10c will be stored in the curved section 10c of the first coil 10 without gaps. When subsequent coils 10 are mounted in this manner, the windings 10A of the coils 10 will be mounted to the stator core 20 without gaps, resulting in the completion of a stator as shown in FIGS. 22 (a) and (b), which enables the following:

(D) The space factor of the coils in the slots can be made high.

(E) The coil ends can be made small for use in an electromechanical device.

(When two coils are stored in one slot) In this case, as shown in FIG. 20 (a), the first and second storage sections 11a and 11b of the first coil 10 are respectively stored in a first slot 22 and a second slot 22 separate from the first slot 22 by a certain distance, at which time the windings 10A constituting the first and second storage sections 11a and 11b are in an unraveled state in the slots 22, leaving space for insertion of the first and second storage sections 11a and 11b of subsequent coils 10 to be stored.

Actual insertion of the coils 10 into the stator core 20 is carried out by applying an ejecting force to the windings 10A constituting the first and second storage sections 11a and 11b of the coils 10 in a direction that is orthogonal to the wire direction of the windings 10A. Further, at each axial opening 23 of the stator core 20 there is formed a protrusion for preventing windings 10A that have been inserted from popping out. In other words, when viewing the stator core 20 from above, as exemplarily shown in FIG. 13 (a), the outer sides of the slots are wider than the openings.

When inserting the first and second storage sections 11a and 11b of the coil 10 held by the holding tools 30 through the narrow openings (axial openings 23) of such a stator core 20, the windings 10A must be inserted little by little in a direction that is orthogonal to the wire directions of the windings 10A. In a case where round wire is employed as the windings 10A, they can be stored smoothly without any resistance. In addition, since the coils 10 are wound by distributed winding, upon entering the outer side, which is wider than the opening of the stator core 20, the windings 10A will naturally unravel in a direction that is orthogonal to the wire direction. As a result, the windings 10A in the stator core 20 will be inserted into the outer side at a high density, which makes the use of round wires more advantageous.

Further, in the state shown in FIG. 20 (a), a twisted section 10d as shown in FIGS. 9 (a) and (b) is formed in the first and second coil ends 12a and 12b of the coil 10, which twisted section 10d is formed by relative rotation of the holding tools 30 in the state shown in FIG. 3 (a) by 180 degrees (to the state shown in FIG. 9 (b)). At this time, the winding sections are twisted in upward order, such that, as shown in FIG. 23 (c), around the first and second coil ends 12a and 12b of the first coil 10 there is formed a space in which the twisted section 10d of a second coil 10 can be arranged in a closely adhered state. In other words, a next coil receiver 10e is formed.

When coils 10 are subsequently mounted in the same manner, the windings 10A of the coils will be mounted on the stator core 20 without gaps, resulting in the completion of a stator as shown in FIGS. 1 (a) and (b), which achieves the following:

(D) The space factor of the coils in the slots can be made high.
(E) The coil ends can be made small for use in an electromechanical device.

Both in the case where one coil is stored in one slot, and in the case where two coils are stored in one slot, the distributedly wound coils 10 are stored after being put in the state shown in FIG. 9 (b). In other words, looking at one coil 10, the position of the first storage section 11a stored in the first slot 22 is on the opposite side relative to the second storage section 11b stored in the second slot 22 separate from the first slot by a certain distance, due to the twisted section 10d of the coil 10.

In this state, that is when the first storage section 11a and the second storage section 11b are on opposite sides due to the twisted section 10d of the coil 10, when the first section of the windings 10A of the first storage section 11a stored in the first slot 22 is on the inner side, as shown in FIG. 20 (a), the last section of the windings 10A of the second storage section 11b stored in the second slot 22 separate from the first slot by a certain distance will be located on the outer side of the second slot 22.

In general, when a distributedly wound coil without a twisted section is stored in two slots, the first section of the windings of the first storage section stored in a first slot and the last section of the windings of the second storage section, stored in a second slot separate from the first slot by a certain distance, will be located in the same position of each slot. Since the slots, both on the rotor side and on the core side, are formed radially relative to the center of the armature, the measurements of their inner sides and the measurements of their outer sides are different. Thus, when a distributedly wound coil without a twisted section is stored within two slots, the windings will be stored in the same position, which causes inductance non-uniformity in the inner and outer windings (wires), leading to an overall drop in efficiency of the coil. The reason for this is that when an identical voltage is applied to the wires simultaneously, a greater current will flow in the wires with lower inductance, and this inductance non-uniformity will work toward reducing overall efficiency of the coil.

In the coil 10 according to this technical means, the presence of the twisted section 10d means that, as exemplarily shown in FIG. 9 (b) or FIG. 20 (a), when the first section of the windings 10A of the first storage section 11a stored in a first slot 22 is on the inner side, the last section of the windings 10A of the second storage section 11b stored in the second slot 22 separate from the first slot by a certain distance will be located on the outer side of the second slot 22, which reduces or suppresses the inductance non-uniformity in the parts (wires) of the coil 10, so that more magnetic flux is generated.

When the inductance non-uniformity in the parts (wires) of the coil 10 is reduced or suppressed, an overall drop in efficiency of the coils 10 is suppressed. As a result, the efficiency of an electromechanical device using these coils 10 can be improved, and the electromechanical device itself will have high output, and can be made smaller and lighter.

As described above, in the coil 10 according to the technical means 1, the presence of the twisted section 10d reduces or suppresses inductance non-uniformity in the parts (wires), which thereby enables an electromechanical device in which the coil 10 is used to have high output, and to be made smaller and lighter. As a result, the coil 10 enables the following:
(F) Inductance non-uniformity in each winding can be equalized to increase coil efficiency.

Both in a case where one coil is stored in one slot and in a case where two coils are stored in one slot, employing the coil 10 according to the technical means 1 enables the following:
(A) Both round wires and rectangular wires may be used as the conducting wires that constitute the coils, with no limitations on the shape of the cross-section of the wires.
(B) Manufacturing and handling of the coils is easy.
(C) Insertion of the coils into the slots can be done easily.
(D) The space factor of the coils in the slots can be made high.
(E) The coil ends can be made small for use in an electromechanical device.
(F) Inductance non-uniformity in each winding can be equalized to increase coil efficiency.
(G) As a result, the armature can be made compact and efficient, and it is also easy to manufacture the electromechanical device.

Accordingly, the coil 10 according to the technical means 1 has no limitations on the cross-sectional shapes of the conducting wires used to construct the coil, is easy to manufacture and handle, can easily be inserted into the slots and can have a high space factor in the slots, and has small coil ends allowing for high efficiency when used in an electromechanical device.

According to technical means 2, in the coil 10 for electromechanical devices according to the aforementioned technical means 1, "between a first radial section formed by a winding-start section 10a and a second radial section formed by a winding-end section 10b of the windings 10A constituting the coil, the radii of the winding lap sections formed by the windings 10A change in a stepped manner".

As shown in FIG. 2 or FIG. 8, the coil 10 according to the technical means 2 consists of one or more windings 10A that are distributedly wound on a tapered cylinder or a tapered frame, and two sections of the coil are held by holding tools 30. During the time from completion of the coil 10 until it has been stored in a certain slot of the core 20, these holding tools 30 prevent the distributedly wound windings 10A from unraveling, and enable deformation of the first and second coil ends 12a and 12b before they are stored, without causing deformation of the first and second storage sections 11a and 11b. This is similar to the technical means 1 described above.

In this coil 10, between a first radial section formed by a winding-start section 10a and a second radial section formed by a winding-end section 10b of the windings 10A constituting the coil, the radii of the winding lap sections formed by the windings 10A change in a continuous or stepped manner, as shown in FIG. 2 (b) or 8. Further, in this coil 10, the sections of the windings 10A that constitute the first and second storage sections 11a and 11b are held by two holding tools 30 such that the winding lap sections are maintained aligned with each other. The term "lap winding section" here means one "lap" around the bobbin of one winding 10A. Accordingly, this coil 10 enables the following:

(B) Manufacturing and handling of the coils is easy.
(C) Insertion of the coils into the slots can be done easily.

The coil 10 according to the technical means 2 is manufactured according to the manufacturing method described later, in which one or more windings 10A are distributedly wound around a tapered cylinder or a tapered frame, thereby forming first and second storage sections 11a and 11b to be stored in slots 22 defined by teeth 21, and first and second coil ends 12a and 12b that are continuous between the first and second storage sections 11a and 11b and arranged on the outside of a core 20, and the first and second storage sections 11a and 11b of the coil 10 are held by two holding tools 30 in a state maintaining the alignment of the windings 10A. Accordingly, this coil 10 enables the following:

(A) Both round wires and rectangular wires may be used as the conducting wires that constitute the coils, with no limitations on the shape of the cross-section of the wires.

In this coil 10, it is important that the radii change in a stepped manner between the winding-start section 10a and the winding-end section 10b, and that to maintain this state, the first and second storage sections 11a and 11b are held by the holding tools 30 in a state maintaining the alignment of the windings 10A, as described above. This is because, as described regarding the mounting method for mounting the coils 10 onto the teeth 21, when mounting a plurality of coils 10 onto a plurality of teeth 21 and forming a curved section 10c in the first coil end 12a and the second coil end 12b, or when forming a twisted section 10d in the first coil end 12a and the second coil end 12b so that the twisted sections 10d of the coils 10 can overlap with each other, the first and second coil ends 12a and 12b of the first coil will themselves naturally deform such that the first and second coil ends 12a and 12b of the next coil 10 can overlap without gaps. Accordingly, this coil 10 enables the following: (D) The space factor of the coils in the slots can be made high. Such coils 10 are then stored in slots 22 in the manner described below.

(When One Coil is Stored in One Slot)

In this case, the first and second storage sections 11a and 11b of the first distributedly wound coil 10 are respectively stored in a first slot 22 and in another slot 22 separate from the first slot 22 by a certain distance, as shown in FIG. 24. The curved section 10c of for example the first coil end 12a will protrude towards the center where the rotor of the stator core 20 is to be stored, as shown in FIGS. 23 (c) and 24. At this time, however, since the radii change in a stepped manner between the winding-start section 10a and the winding-end section 10b of the coil 10, a curved section 10c in which the winding-end section 10b is the widest opening is naturally formed at the lower side of the first coil end 12a, as shown in FIG. 21 (c).

A second coil 10 is mounted adjacent to the first coil 10, and since a curved section 10c and a next coil receiver 10e as shown in FIG. 23 are also formed in this second coil 10, the curved section 10c and next coil receiver 10e will be stored in the curved section 10c and next coil receiver 10e of the first coil 10 without gaps. When subsequent coils 10 are mounted in this manner, the windings 10A of the coils 10 will be mounted to the stator core 20 without gaps, resulting in the completion of a stator as shown in FIGS. 22 (a) and (b), which enables the following:

(D) The space factor of the coils in the slots can be made high.
(E) The coil ends can be made small for use in an electromechanical device.

(When Two Coils are Stored in One Slot)

In this case, as shown in FIG. 20 (a), the first and second storage sections 11a and 11b of the first coil 10 are respectively stored in a first slot 22 and a second slot 22 separate from the first slot 22 by a certain distance, at which time the windings 10A constituting the first and second storage sections 11a and 11b are in an unraveled state in the slots 22, leaving space for insertion of the first and second storage sections 11a and 11b of subsequent coils 10 to be stored.

Actual insertion of the coils 10 into the stator core 20 is carried out by applying an ejecting force to the windings 10A constituting the first and second storage sections 11a and 11b of the coils 10 in a direction that is orthogonal to the wire direction of the windings 10A. Further, at each axial opening 23 of the stator core 20 there is formed a protrusion for preventing windings 10A that have been inserted from popping out. In other words, when viewing the stator core 20 from above, as exemplarily shown in FIG. 13 (a), the outer sides of the slots are wider than the openings.

When inserting the first and second storage sections 11a and 11b of the coil 10 held by the holding tools 30 through the narrow openings (axial openings 23) of such a stator core 20, the windings 10A must be inserted little by little in a direction that is orthogonal to the wire directions of the windings 10A. In a case where round wire is employed as the windings 10A, they can be stored smoothly without any resistance. In addition, since the coils 10 are wound by distributed winding, upon entering the outer side, which is wider than the opening of the stator core 20, the windings 10A will naturally unravel in a direction that is orthogonal to the wire direction. As a result, the windings 10A in the stator core 20 will be inserted into the outer side at a high density, which makes the use of round wires more advantageous.

Further, in the state shown in FIG. 20 (*a*), a twisted section 10*d* as shown in FIGS. 9 (*a*) and (*b*) is formed in the first and second coil ends 12*a* and 12*b* of the coil 10, which twisted section 10*d* is formed by relative rotation of the holding tools 30 in the state shown in FIG. 3 (*a*) by 180 degrees (to the state shown in FIG. 9 (*b*)). At this time, since the radii of the lap winding sections formed by the windings 10A change in a stepped manner between the first radial section formed by the winding-start section 10*a* and the second radial section formed by the winding-end section 10*b* of the windings 10A, in the twisted section 10*d*, the winding sections will be twisted, in upward order, from the winding section with the smallest radius to the winding section with the largest radius, and around the first coil end 12*a* and second coil end 12*b* of the first coil 10 will be formed a space in which a twisted section 10*d* of a second coil 10 can be arranged in a closely adhered state, as shown in FIGS. 9 and 20 (*b*).

When coils 10 are subsequently mounted in the same manner, the windings 10A of the coils will be mounted on the stator core 20 without gaps, resulting in the completion of a stator as shown in FIGS. 1 (*a*) and (*b*), which achieves the following:
(D) The space factor of the coils in the slots can be made high.
(E) The coil ends can be made small for use in an electromechanical device.

Further, in the state shown in FIG. 20 (*a*), a twisted section 10*d* as shown in FIGS. 9 (*a*) and (*b*) is formed in the first and second coil ends 12*a* and 12*b* of the coil 10, which twisted section 10*d* is formed by relative rotation of the holding tools 30 in the state shown in FIG. 3 (*a*) by 180 degrees (to the state shown in FIG. 9 (*b*)). At this time, since the radii of the lap winding sections formed by the windings 10A change in a stepped manner between the first radial section formed by the winding-start section 10*a* and the second radial section formed by the winding-end section 10*b* of the windings 10A, in the twisted section 10*d*, the winding sections will be twisted, in upward order, from the winding section with the smallest radius to the winding section with the largest radius, and around the first coil end 12*a* and second coil end 12*b* of the first coil 10 will be formed a space in which a twisted section 10*d* of a second coil 10 can be arranged in a closely adhered state, as shown in FIGS. 9 and 20 (*b*).

Both in a case where one coil is stored in one slot and in a case where two coils are stored in one slot, employing the coil 10 according to the technical means 2 enables the following:
(A) Both round wires and rectangular wires may be used as the conducting wires that constitute the coils, with no limitations on the shape of the cross-section of the wires.
(B) Manufacturing and handling of the coils is easy.
(C) Insertion of the coils into the slots can be done easily.
(D) The space factor of the coils in the slots can be made high.
(E) The coil ends can be made small for use in an electromechanical device.
(F) Inductance non-uniformity in each winding can be equalized to increase coil efficiency.
(G) As a result, the armature can be made compact and efficient, and it is also easy to manufacture the electromechanical device.

Accordingly, the coil 10 according to the technical means 2 has no limitations on the cross-sectional shapes of the conducting wires used to construct the coil, is easy to manufacture and handle, can easily be inserted into the slots and can have a high space factor in the slots, and has small coil ends allowing for high efficiency when used in an electromechanical device.

Technical means 3 is as follows:
"A method for manufacturing a coil 10 to be mounted in slots 22 between a plurality of teeth 21 of a core for an electromechanical device that converts electrical and mechanical energy, the method including the following steps:
(α) winding one or more windings 10A around the periphery of a bobbin 40 in the shape of a cylinder or frame having two insertion grooves 41 to form first and second storage sections 11*a* and 11*b* to be stored in the slots 22, and first and second coil ends 12*a* and 12*b* that are continuous between the first and second storage sections 11*a* and 11*b*;
(β) inserting a holding tool 30 into each insertion groove 41 to hold the windings 10A constituting the first and second storage sections 11*a* and 11*b* while maintaining the alignment of the windings 10A; and
(γ) removing the coil 10 from the bobbin 40 while holding the first and second storage sections 11*a* and 11*b* of the coil 10 with the holding tools 30."

In step (α) of this manufacturing method, in an example described below, a bobbin 40 as shown in FIG. 2 (*b*) or FIG. 8 is employed, which bobbin 40 is, for example, a tapered cylinder as shown in FIG. 2 (*b*), where the diameter at the left end is the smallest and the diameter at the right end is the greatest. Of course, this bobbin 40 may be a simple cylinder with a uniform diameter, or a frame, in which case the frame may be tapered, with one end being smallest and the other end being greatest.

In addition, as shown in FIG. 2 (*b*) or FIG. 8, in the bobbin 40 there are formed two insertion grooves 41 into each of which one of the two plates that constitute a holding tool 30 is inserted. A plurality of these bobbins 40 are used in actual manufacturing of the coils 10, in which case the bobbins 40 are integrated in the axial direction, having the large diameter ends paired together and the small diameter ends paired together.

In this step a, the one or more windings 10A that are the material of the coil 10 are wound around the periphery of the cylindrical or frame-shaped bobbin 40. Winding of the windings 10A in practice is carried out by feeding the windings 10A which are subjected to a predetermined tensile load onto the aforementioned integrated bobbins 40 while rotating the bobbins 40. About 4 windings 10A are fed at a time.

Further, in a case where several bobbins 40 are integrated in the axial direction, having the large diameter ends paired together and the small diameter ends paired together, a plurality of coils 10 may be formed simultaneously. In such a case, since the windings 10A are fed continuously, connections of the windings 10A at the winding-start sections 10*a* and winding-end sections 10*b*, in other words connecting wires 10C, can be formed between adjacent coils 10.

In this manner, a coil 10 having a first storage section 11*a* and a second storage section 11*b*, and a first coil end 12*a* and a second coil end 12*b* that are continuous between the first and second storage sections 11*a* and 11*b*, is formed on the bobbin 40.

Next, in step (β), after inserting part of the holding tools 30 into the insertion grooves 41 as shown in phantom in FIG. 2 (*b*), the windings 10A constituting the first storage section 11*a* and the second storage section 11*b* are clamped by the holding tools 30. The windings 10A constituting the first storage section 11*a* and the second storage section 11*b* are thus held in parallel to each other by the holding tools 30.

Then, in step (γ), the holding tools 30 hold the first storage section 11*a* and the second storage section 11*b* of the windings 10A while the holding tools 30 and the bobbin 40 are moved relative to each other, so that the coil 10 with the windings 10A constituting the first storage section 11*a* and the second storage section 11*b* held in parallel to each other by the holding tools 30 is removed and separated from the bobbin 40.

Further, in this step (γ), in a case where several bobbins 40 are integrated in the axial direction, having the large diameter ends paired together and the small diameter ends paired together, a required number of coils 10 in which the winding-start sections 10*a* and winding-end sections 10*b* are connected can be formed by cutting the windings 10A at locations other than those between adjacent coils 10 that are to be connected at the winding-start sections 10*a* and winding-end sections 10*b*.

Accordingly, the manufacturing method according to the technical means 3 enables very easy manufacturing of a coil 10 that is easy to manufacture and handle, can easily be inserted into the slots and can have a high space factor in the slots, and has small coil ends allowing for high efficiency when used in an electromechanical device.

Technical means 4 is as follows:
"A method for mounting a coil 10 as described in technical means 1 or technical means 2 in slots 22 between a plurality of teeth 21 of a core for an electromechanical device that converts electrical and mechanical energy, the method including the following steps:
(a) forming a curved section 10*c* in the first and second coil ends 12*a* and 12*b* between the two holding tools 30 holding one coil 10;
(b) aligning the exits 31 of the holding tools 30 holding the coil 10 with the axial openings 23 of two respective slots 22 that are separate from each other by a specific distance;
(c) Pushing the first and second storage sections 11*a* and 11*b* held by the respective holding tools 30 into the slots 22 through the exits 31; and
(d) inserting the next coil 10, in which a curved section 10*c* is formed through the aforementioned steps (a) to (c), into the next slots 22 after the slots 22 in which the first coil 10 is mounted, such that the curved section 10*c* of the next coil 10 is inserted in the curved section 10*c* of the first coil 10, and repeating these steps."

This mounting method is intended to mount one coil 10 into each of a plurality of slots 22 between the teeth 21 of a core 20 for an electromechanical device to complete a stator, as shown in FIG. 22. In step (a), as shown in FIG. 24, a curved section 10*c* is first formed in each of the first and second coil ends 12*a* and 12*b* between two holding tools 30 holding one coil 10.

As a result, as shown in FIG. 23 (*a*) to (*c*), the first radial section formed by the winding-start section 10*a* and the second radial section formed by the winding-end section 10*b* of the windings 10A change in a stepped manner with respect to the holding tools 30, and a curved section 10*c* open at the second radial section will be formed between each of the first and second coil ends 12*a* and 12*b* and the ends of the holding tools 30, as shown in FIG. 23 (*c*). In this case, the curved section 10*c* of for example the first coil end 12*a* will protrude towards the center where the rotor of the stator core 20 is to be stored, as shown in FIGS. 23 (*c*) and 24. At this time, however, since the radii change in a stepped manner between the winding-start section 10*a* and the winding-end section 10*b* of the coil 10, a curved section 10*c* in which the winding-end section 10*b* is the widest opening is naturally formed at the lower side of the first coil end 12*a*, as shown in FIG. 23 (*c*).

Employing the coil 10 in which this curved section 10*c* is formed, in step (b), the exits 31 of the holding tools 30 holding the first coil 10 are aligned with the axial openings 23 of two respective slots 22 that are separate from each other by a specific distance. Next, in step (c), the first and second storage sections 11*a* and 11*b* held by the respective holding tools 30 are pushed into the slots 22 through the exits 31.

Then, in step (d), the next coil 10, in which a curved section 10*c* is formed through the aforementioned steps (a) to (c), is then inserted into the next slots 22 after the slots 22 in which the first coil 10 is mounted, such that the curved section 10*c* of the next coil 10 is inserted in the curved section 10*c* of the first coil 10.

When the second coil 10 is mounted immediately adjacent to the first coil 10, since the second coil 10 in this case also has a curved section 10*c* as shown in FIG. 23, this curved section 10*c* will be stored without gaps within the curved section 10*c* of the first coil 10. Subsequent coils 10 are then mounted in the same manner.

At this time, when coils 10 are mounted onto a stator core 20, as shown in FIGS. 23 (*c*) and 24, the curved sections 10*c* of for example the first coil ends 12*a* protrude inwardly, where the rotor of the stator core 20 is to be arranged, causing the curved sections 10*c* to be bent toward the opposite side in a next step. In a case where the coils 10 are mounted onto a rotor, the curved sections 10*c* of the first and second coil ends 12*a* and 12*b* do not need to be bent, as they protrude toward the center.

As a result, the coils 10 and the windings 10A of the coils will be mounted on the stator core 20 without gaps, resulting in the completion of a stator as shown in FIG. 22, which achieves the following:
(D) The space factor of the coils in the slots can be made high.
(E) The coil ends can be made small for use in an electromechanical device.

Accordingly, the technical means 4 facilitates mounting of coils onto the teeth of the stator core or rotor when storing one coil in one slot, which allows for the electromechanical device to be made compact, facilitating manufacturing of the electromechanical device itself.

Finally, technical means 5 is as follows:
"A method for mounting a coil 10 as described in technical means 1 or technical means 2 in slots 22 between a plurality of teeth 21 of a core for an electromechanical device that converts electrical and mechanical energy, the method including the following steps:
(i) aligning the exit 31 of the holding tool 30 holding the first storage section 11*a* of the coil 10 with the axial opening 23 of one slot 22, and inserting the first storage section 11*a* into the slot 22;
(ii) twisting the holding tool 30 holding the second storage section 11*b* of the coil 10 relative to the holding tool 30 that was holding the first storage section 11*a* so as to form a twisted section 10*d* in the first and second coil ends 12*a* and 12*b*;
(iii) aligning the exit 31 of the other holding tool 30 holding the second storage section 11*b* of the coil 10 with the axial opening 23 of another slot 22 separate from the aforementioned slot 22, and inserting the second storage section 11*b* into the slot 22; and
(iv) inserting a subsequent coil 10 into a slot 22 other than that in which the previous coil 10 is mounted, while overlapping a twisted section 10d of the subsequent coil formed in steps (i) to (ii) with the twisted section 10d of the previous coil 10, and repeating these steps."

The mounting method according to the technical means 5 differs from that according to technical means 4, and as shown in FIG. 20, is intended to insert or mount the first storage section 11a of a first coil 10 and the second storage section 11b of a second coil 10 into a plurality of slots 22 of a rotor 20, to complete a stator as shown in FIG. 1. In an initial step of this insertion or mounting of the coils 10, as shown in FIG. 20 (a), the first and second storage sections 11a and 11b of the first coil 10 are distributed and stored respectively in a first slot 22, and another slot 22 separate from the first slot 22 by a certain distance. At this time, the volume of the windings 10A of each of the first and second storage sections 11a and 11b is half the volume of each slot 22, so the windings 10A are in an unraveled state within the slots 22. There is enough free space left in each slot with the first storage second 11a or the second storage section 11b stored therein to accommodate the first storage section 11a or the second storage section 11b of another coil 10 to be subsequently stored.

In step (i), the exit 31 of the holding tool 30 holding the first storage section 11a of the coil 10 is aligned with the axial opening 23 of one slot 22, and the storage section 11a is then inserted into the slot 22. In a case where the second storage section 11b of another coil 10 has not yet been inserted into the slot 22 into which this first storage section 11a is to be inserted, the windings 10A constituting the first storage section 11a will be stored in the slot 22 in an unraveled state, and by forcefully packing the second storage section 11b of another coil 10 into the slot 22, the first storage section 11a of the first coil 10 and the second storage section 11b of the subsequent coil 10 will be stored in a closely adhered state. This insertion is carried out by the holding tool 30 and the ejecting plate that ejects the windings 10A from the holding tool 30 in step (iii).

In step (ii), the holding tool 30 holding the second storage section 11b of the coil 10 is twisted relative to the holding tool 30 that was holding the first storage section 11a so as to form a twisted section 10d as exemplarily shown in FIG. 9 in the first and second coil ends 12a and 12b. This twisted section 10d is formed by relative rotation of the holding tools 30 in the state shown in FIG. 3 (a) by 180 degrees (to the state shown in FIG. 9 (b)).

When this twisted section 10d is formed, between a first radial section formed by a winding-start section 10a and a second radial section formed by a winding-end section 10b of the windings 10A, the radii of the winding lap sections formed by the windings 10A change in a stepped manner. Therefore, in the twisted section 10d, the winding sections will be twisted, in upward order, from the winding section with the smallest radius to the winding section with the largest radius, and around the first coil end 12a and second coil end 12b of the first coil 10 will be formed a space in which a twisted section 10d of a second coil 10 can be arranged in a closely adhered state, as shown in FIGS. 9 and 20 (b).

Next, in step (iii), the exit 31 of the other holding tool 30 holding the second storage section 11b of the coil 10 is aligned with the axial opening 23 of another slot 22 separate from the aforementioned slot 22, and the second storage section 11b is ejected from the holding tool 30 by the ejecting plate and inserted into the slot 22.

In step (iv), a subsequent coil 10 is inserted into a slot 22 other than that in which the previous coil 10 is mounted, while overlapping a twisted section 10d of the subsequent coil formed in steps (i) to (ii) with the twisted section 10d of the previous coil 10. This process is then repeated.

At this time, the center of the twisted section 10d of the previous coil 10 is more constricted due to the twisting than the peripheral sections, such that the peripheral sections of the twisted section 10d are in an expanded state, so that a space is formed in the vicinity of the twisted section 10d in which the twisted section 10d of a subsequent coil 10 to be inserted into a subsequent slot 22 separate from the first slot 22 by a certain pitch can be stored in a closely adhered state. In other words, the twisted section 10d of the subsequent coil 10 is arranged so as to be entwined with the twisted section 10d of the previous coil 10, and once insertion of the previous coil 10 and the adjacent subsequent coil 10 is finished, these twisted sections 10d will be in a closely adhered state.

In the stator core 20 constituting the electromechanical device, which is a motor or a generator or the like, the plurality of slots 22 having axial openings 23 are formed in a circular shape with the axial openings 23 in communication with the circular opening in which the rotor is to be stored. Conversely, on the outer surface of a rotor that is stored in the circular opening of a stator core 20, a plurality of slots 22 are formed in a circular shape with the axial openings 23 facing outward.

When two distributedly wound coils 10 are to be inserted into such a plurality of slots 22 in a state where two coils are stored in one slot, there will naturally be cases where coils 10 previously inserted in the final step become obstructions. By final step is meant a step in which, when the first storage sections 11a of the first to seventh coils 10 are inserted in order into the first to seventh slots 22, respectively, the second storage sections 11b of the final $n^{th}$ to $n-6^{th}$ coils 10 are inserted into the final $n^{th}$ to $n-6^{th}$ slots 22.

Thus, in the final step of the insertion process, with respect to a slot 22 into which the second storage section 11b is to be inserted but a first storage section 11a of the previous coil 10 has already been inserted, the first storage section 11a is temporarily taken out and the second storage section 11b of the next coil 10 is inserted and pushed into the outer side of the slot 22, while the first storage section 11a is reinserted so as to be at the inner side.

In this way, when coils 10 are subsequently mounted, the windings 10A of the coils will be mounted on the stator core 20 without gaps, resulting in the completion of a stator as shown in FIGS. 1 (a) and (b), which achieves the following:
(D) The space factor of the coils in the slots can be made high.
(E) The coil ends can be made small for use in an electromechanical device.

Therefore, according to the technical means 5, in a case where two coils are stored in one slot, mounting of the coils onto the teeth of the stator core or rotor can be easily performed and the electromechanical device can be made compact, facilitating manufacturing of the electromechanical device itself.

DESCRIPTION OF THE REFERENCE NUMERAL

100 Stator
10 Coil
10A Winding
10B Boundary line
10C Connecting wire
10a Winding-start section
10b Winding-end section 10c Curved section
10d Twisted section
10e Next coil receiver
11a First storage section
11b Second storage section
12a First coil end
12b Second coil end
20 Core
21 Teeth
22 Slot
22a Inner side storage section
22b Outer side storage section
23 Axial opening
30 Holding tool
31 Exit
31a Stopper
32 Base plate
32a Holding space
33 Swinging plate
34 First engaging pin
35 Second engaging pin
40 Bobbin
41 Insertion groove
50 Coil mounting device
51 Coil shelf
52 Core rotator
53a First assist arm
53b Second assist arm
54a First guide channel
54b Second guide channel
55a First stopper
55b Second stopper

The invention claimed is:

1. A pair of holding tools configured to hold a coil to be mounted in slots between a plurality of teeth of a core for an electromechanical device that converts electrical and mechanical energy, each holding tool comprising:
   at least two base plates openably coupled at one end by a hinge;
   an exit formed between the other ends of the base plates, the exit capable of being aligned with an axial opening of one slot; and
   a holding space that is openable at the exit and that, when the base plates close, holds windings constituting the coil between two flat surfaces defined by the base plates, in a state in which an alignment of the windings is maintained in an abutting configuration,
   wherein one holding tool of the pair of holding tools holds a first storage section of the coil, and the other holding tool of the pair of holding tools holds a second storage section 11b of the coil, and wherein when mounting the coil in the slots, each holding space communicates with an interior of the slot through the axial opening via the holding tool.

2. The holding tool according to claim 1, wherein a stopper is provided to at least one of the base plates near the exit, the stopper disposed so as to extend across the exit between the base plates when the base plates close, so as to block the windings in the holding space from popping out.

3. The holding tool according to either claim 1 or claim 2, wherein the exit of each holding tool is provided with lips that guide the coil into the axial opening of the slot.

* * * * *